United States Patent
Ikezawa et al.

(10) Patent No.: US 11,244,179 B2
(45) Date of Patent: Feb. 8, 2022

(54) STOP LINE POSITION ESTIMATION DEVICE AND VEHICLE CONTROL SYSTEM

(71) Applicant: TOYOTA JIDOSHA KABUSHIKI KAISHA, Toyota (JP)

(72) Inventors: Yuta Ikezawa, Susono (JP); Kohei Tochigi, Shizuoka-ken (JP); Shogo Ito, Shizuoka-ken (JP); Hirotada Otake, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/993,731

(22) Filed: Aug. 14, 2020

(65) Prior Publication Data

US 2021/0064894 A1  Mar. 4, 2021

(30) Foreign Application Priority Data

Aug. 27, 2019  (JP) .............................. JP2019-154850

(51) Int. Cl.
*G06K 9/00* (2006.01)
*G08G 1/09* (2006.01)
*G08G 1/16* (2006.01)

(52) U.S. Cl.
CPC ........... *G06K 9/00825* (2013.01); *G08G 1/09* (2013.01); *G08G 1/166* (2013.01)

(58) Field of Classification Search
None
See application file for complete search history.

(56) References Cited

U.S. PATENT DOCUMENTS

| 2014/0303868 | A1* | 10/2014 | Otake ............. B60W 30/18109 701/70 |
|---|---|---|---|
| 2018/0150705 | A1 | 5/2018 | Yamanoi et al. |
| 2018/0154870 | A1 | 6/2018 | Kurata |
| 2019/0031174 | A1 | 1/2019 | Adachi |
| 2019/0135282 | A1* | 5/2019 | Sakaguchi ...... B60W 30/18027 |
| 2019/0389465 | A1* | 12/2019 | Ogino .................. B60W 30/09 |
| 2020/0156533 | A1* | 5/2020 | Lee ..................... G06K 9/00362 |
| 2020/0298709 | A1* | 9/2020 | Yanagita .............. G05D 1/0214 |

(Continued)

FOREIGN PATENT DOCUMENTS

| EP | 3306589 A1 | 4/2018 |
|---|---|---|
| JP | 2005-063398 A | 3/2005 |
| JP | 2007-257299 A | 10/2007 |

(Continued)

*Primary Examiner* — Van T Trieu
(74) *Attorney, Agent, or Firm* — Sughrue Mion, PLLC

(57) ABSTRACT

A stop line position estimation device includes a traffic signal recognition unit configured to recognize a traffic signal at an intersection ahead of a vehicle and a stop line position estimation unit configured to estimate that a position of the stop line is a position from the traffic signal by a first distance toward the vehicle side. When the traffic signal recognition unit recognizes a plurality of traffic signals and the stop line position estimation unit recognizes an immediate front traffic signal and a rear traffic signal based on a positional relationship between the traffic signals, the stop line position estimation unit estimates that the position of the stop line is a position from the immediate front traffic signal by a second distance toward the vehicle side. The second distance is shorter than the first distance.

7 Claims, 11 Drawing Sheets

(56) References Cited

U.S. PATENT DOCUMENTS

2020/0402406 A1* 12/2020 Sakakibara ...... G08G 1/096791

FOREIGN PATENT DOCUMENTS

| JP | 2016224802 A | 12/2016 |
| JP | 2018-060563 A | 4/2018 |
| JP | 2018-092371 A | 6/2018 |
| JP | 2019-028523 A | 2/2019 |
| JP | 2019-053709 * | 3/2019 |
| KR | 10-2018-0008727 A | 1/2018 |

* cited by examiner

STOP LINE POSITION ESTIMATION DEVICE AND VEHICLE CONTROL SYSTEM

CROSS-REFERENCE TO RELATED APPLICATION

This application claims priority to Japanese Patent Application No. 2019-154850 filed on Aug. 27, 2019, incorporated herein by reference in its entirety.

BACKGROUND

1. Technical Field

The disclosure relates to a stop line position estimation device and a vehicle control system.

2. Description of Related Art

Japanese Unexamined Publication Application No. 2005-063398 discloses a technology on a position of a stop line. In the above document, a vehicle control device that recognizes the position of the stop line ahead of a vehicle based on an image recognition by a camera of the vehicle is disclosed.

SUMMARY

However, it may be impossible to perform image recognition of the stop line on a road surface on an image due to rubbing of the white stop line. It may also be impossible to recognize the stop line when it is hidden from an imaging range of the camera by a preceding vehicle traveling ahead of the vehicle. In such cases, the position of the stop line may be appropriately estimated based on a position of a traffic signal at an intersection.

A stop line position estimation device according to a first aspect of the present disclosure includes: a traffic signal recognition unit configured to recognize a traffic signal at an intersection ahead of a vehicle based on a detection result by an external sensor of the vehicle; and a stop line position estimation unit configured to estimate that a position of a stop line is a position from the traffic signal by a first distance toward a vehicle side, and estimate, when the traffic signal recognition unit recognizes a plurality of traffic signals and the stop line position estimation unit recognizes an immediate front traffic signal and a rear traffic signal based on a positional relationship between the plurality of traffic signals, that the position of the stop line is a position from the immediate front traffic signal by a second distance toward the vehicle side, the second distance being shorter than the first distance, the immediate front traffic signal being a traffic signal on the vehicle side of the intersection and closest to the vehicle, and the rear traffic signal being a traffic signal on a far side of the intersection.

In the stop line position estimation device according to the first aspect of the present disclosure, when the plurality of traffic signals is recognized and it is determined that the immediate front traffic signal and the rear traffic signal have been recognized based on the positional relationship between the plurality of traffic signals, it is estimated that the position of the stop line is the position from the immediate front traffic signal by the second distance (shorter than the first distance) toward the vehicle side. Here, when it is estimated that the stop line position is always a position from the traffic signal closest to the vehicle by a certain distance toward the vehicle side, it may be considered that the certain distance is set to be sufficiently long to avoid a wrong estimation that the stop line position is within the intersection because it may not be clear whether the traffic signal is a traffic signal installed in the immediate front of the intersection or a traffic signal installed at the rear of the intersection. However, with the stop line position estimation device according to the first aspect, since the traffic signal in the immediate front of the intersection is used as a reference, it is possible to estimate that the stop line position is a position from the immediate front traffic signal by a short distance toward the vehicle side, such that the stop line position at the intersection is appropriately estimated.

In the above aspect, the stop line position estimation unit may be configured not to recognize, when the plurality of traffic signals is recognized, as the rear traffic signal, the traffic signal of which a distance from the immediate front traffic signal in a proceeding direction of the vehicle is equal to or greater than a same intersection threshold. With the stop line position estimation device, when a plurality of intersections is consecutively positioned in the proceeding direction of the vehicle, it is possible to restrain a traffic signal at a second intersection from the view of the vehicle from being wrongly recognized as the rear traffic signal at a first intersection from the view of the vehicle.

In the above aspect, the stop line position estimation unit may be configured not to recognize a first traffic signal of which a distance from an intermediate position is less than a proximity threshold as the rear traffic signal when there are traffic signals of which the distances from the immediate front traffic signal in the proceeding direction of the vehicle are less than the same intersection threshold, the intermediate position being intermediate between the immediate front traffic signal and a traffic signal farthest from the vehicle among the traffic signals of which the distances from the immediate front traffic signal are less than the same intersection threshold. With the stop line position estimation device, when the plurality of traffic signals are installed on respective lanes in the immediate front of the intersection on a road having a plurality of lanes, it is possible to restrain the plurality of traffic signals in the immediate front of the intersection from being wrongly recognized as a combination of the immediate front traffic signal and the rear traffic signal.

In the above aspect, the traffic signal recognition unit may be configured to estimate a position of a hidden traffic signal based on a position of the hidden traffic signal when having been recognized and change in a position of the vehicle, the hidden traffic signal being in a hidden state after having been recognized; and the stop line position estimation unit may be configured to estimate, when the traffic signal recognition unit recognizes the plurality of traffic signals including the hidden traffic signal ahead of the vehicle and the stop line position estimation unit recognizes the immediate front traffic signal and the rear traffic signal, that the position of the stop line is a position from the immediate front traffic signal by the second distance toward the vehicle side. With the stop line position estimation device, since the position of the hidden traffic signal, which is in the hidden state after having been recognized, can be estimated, it is possible to recognize the immediate front traffic signal and the rear traffic signal based on the position of the hidden traffic signal even when only one traffic signal can be recognized.

In the above aspect, the traffic signal recognition unit may be configured to recognize a vehicle traffic signal and a pedestrian traffic signal; and the stop line position estimation unit may be configured to estimate, when the traffic signal recognition unit recognizes at least one vehicle traffic signal and at least one pedestrian traffic signal as the plurality of traffic signals and the stop line position estimation unit recognizes the vehicle traffic signal as the immediate front traffic signal and the pedestrian traffic signal as the rear traffic signal, based on the positional relationship between the vehicle traffic signal and the pedestrian traffic signal, that the position of the stop line is the position from the immediate front traffic signal by the second distance toward the vehicle side. With the stop line position estimation device, even if a plurality of vehicle traffic signals cannot be recognized, when at least one vehicle traffic signal and at least one pedestrian traffic signal are recognized, it is possible to recognize the immediate front traffic signal and the rear traffic signal based on the positional relationship between the vehicle traffic signal and the pedestrian traffic signal.

A stop line position estimation device according to a second aspect of the present disclosure includes: a traffic signal recognition unit configured to recognize a vehicle traffic signal at an intersection ahead of a vehicle based on a detection result by an external sensor of the vehicle; an intersection area recognition unit configured to recognize, based on the detection result by the external sensor, an intersection area where a lane line of a road on which the vehicle travels is cut off in a proceeding direction of the vehicle; and a stop line position estimation unit configured to estimate that a position of a stop line is a position from the vehicle traffic signal by a first distance toward a vehicle side, and estimate, when the traffic signal recognition unit recognizes the vehicle traffic signal, the intersection area recognition unit recognizes the intersection area, and the vehicle traffic signal is present on the vehicle side of the intersection area, that the position of the stop line is a position from the vehicle traffic signal closest to the vehicle by a third distance toward the vehicle side, the third distance being shorter than the first distance.

With the stop line position estimation device according to the second aspect of the present disclosure, when the vehicle traffic signal and the intersection area are recognized, and the vehicle traffic signal closest to the vehicle is on the vehicle side of the intersection area, it is estimated that the stop line position is the position from the vehicle traffic signal closest to the vehicle by the third distance (shorter than the first distance) toward the vehicle side. Therefore, with the stop line position estimation device according to the second aspect, it is possible to appropriately estimate the stop line position at the intersection as compared to when it is estimated that the stop line position is always a position from the traffic signal closest to the vehicle by a certain distance toward the vehicle side while it is not clear whether the traffic signal is a traffic signal installed in the immediate front of the intersection or a traffic signal installed at the rear of the intersection.

A vehicle control system according to a third aspect of the present disclosure includes: a traffic signal recognition unit configured to recognize a traffic signal at an intersection ahead of a vehicle based on a detection result by an external sensor of the vehicle; a stop line position estimation unit configured to estimate that a position of a stop line is a position from the traffic signal by a first distance toward a vehicle side and estimate, when the traffic signal recognition unit recognizes a plurality of traffic signals and the stop line position estimation unit recognizes an immediate front traffic signal and a rear traffic signal based on a positional relationship between the plurality of traffic signals, that the position of the stop line is a position from the immediate front traffic signal by a second distance toward the vehicle side, the second distance being shorter than the first distance the immediate front traffic signal being a traffic signal on the vehicle side of the intersection and closest to the vehicle, and the rear traffic signal is a traffic signal on a far side of the intersection; and a vehicle control unit configured to control the vehicle based on the position of the stop line estimated by the stop line position estimation unit and the detection result by the external sensor.

With the vehicle control system according to the third aspect of the present disclosure, it is possible to appropriately estimate the stop line position as compared to when it is estimated that the stop line position is always a position from the traffic signal closest to the vehicle by a certain distance toward the vehicle side while it is not clear whether the traffic signal is a traffic signal installed in the immediate front of the intersection or a traffic signal at the rear of the intersection. Therefore, with the vehicle control system, vehicle control such as deceleration and stop of the vehicle can be performed based on the appropriately estimated stop line position.

According to each aspect of the present disclosure, it is possible to appropriately estimate a position of a stop line based on a position of a traffic signal at an intersection.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings.

First Embodiment

Figure 1:
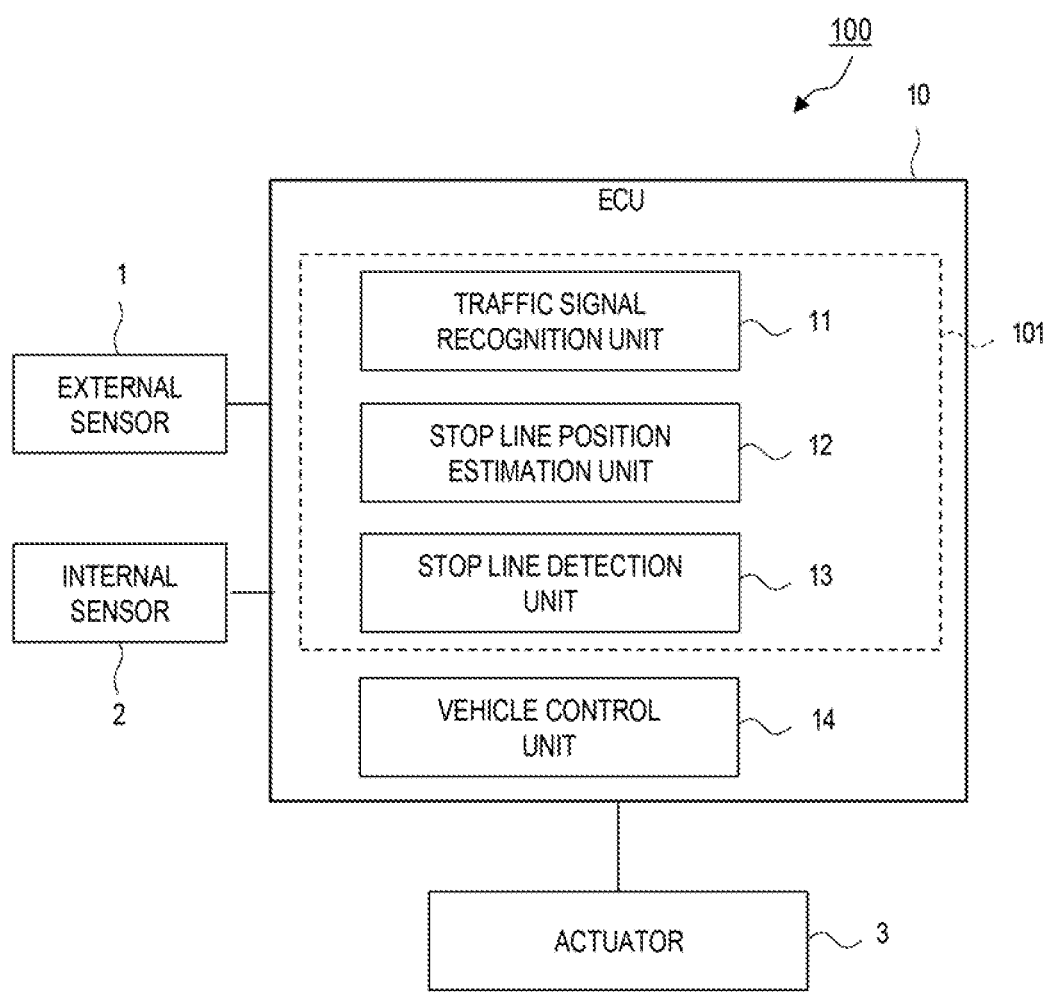
FIG. 1 is a block diagram illustrating one example of a vehicle control system according to a first embodiment.

FIG. 1 is a block diagram illustrating one example of a vehicle control system according to a first embodiment. A vehicle control system 100 illustrated in FIG. 1 is mounted on a vehicle, such as a passenger car, and controls traveling of the vehicle. The vehicle control system 100 may be capable of realizing autonomous driving of the vehicle, or capable of only assisting driving of a driver of the vehicle.

The vehicle control system 100 includes a stop line position estimation device 101. The stop line position estimation device 101 estimates a position of a stop line based on a position of a traffic signal at an intersection. The stop line is a road marking that serves as an indication of a position of a stop or a temporary stop of the vehicle. The stop line position estimation device 101 does not have to determine the presence of the intersection, and may estimate the position of the stop line based on traffic signals installed on places other than the intersection. Details of the stop line position estimation device 101 will be described below.

Configuration of Vehicle Control System According to First Embodiment

As illustrated in FIG. 1, the vehicle control system 100 includes an electronic control unit (ECU) 10 that manages an overall system. The ECU 10 has a central processing unit (CPU), a read-only memory (ROM), a random access memory (RAM), and the like. The ECU 10 implements various functions by, for example, loading a program stored in the ROM into the RAM and executing the program loaded into the RAM via the CPU. The ECU 10 may be composed of a plurality of electronic units. The ECU 10 is connected to an external sensor 1, an internal sensor 2, and an actuator 3.

The external sensor 1 is a detector that detects a situation on the periphery of the vehicle. The external sensor 1 includes at least one of a camera and a radar sensor.

The camera is an image capturing device that captures an external situation of the vehicle. The camera may be, for example, provided on the inside of a front windshield of the vehicle and captures an image in front of the vehicle. The camera transmits image information on the external situation of the vehicle to the ECU 10. The camera may be a monocular camera or a stereo camera.

The radar sensor is a detector that detects an object on the surroundings of the vehicle using a radio-wave (for example, a millimeter wave) or light. Examples of the radar sensor include a millimeter wave radar or a light detection and ranging (LIDAR). The radar sensor detects an object by transmitting the radio-wave or the light to the surroundings of the vehicle, and receiving the radio-wave or the light reflected by the object. The radar sensor transmits information on the detected object to the ECU 10. Examples of the object include a moving obstacle, such as a pedestrian, a bicycle, and another vehicle in addition to a fixed obstacle, such as a guardrail and a building.

The internal sensor 2 is a detector that detects a traveling state of the vehicle. The internal sensor 2 includes a vehicle speed sensor or an acceleration sensor. The internal sensor 2 may include a yaw rate sensor. The vehicle speed sensor is a detector that detects speed of the vehicle. As the vehicle speed sensor, for example, a wheel speed sensor, which is provided to a wheel of a vehicle, a drive shaft that rotates integrally with the wheel, or the like and which detects rotation speed of the wheel, is used. The vehicle speed sensor transmits the detected vehicle speed information (the wheel speed information) to the ECU 10.

The acceleration sensor is a detector that detects acceleration of the vehicle. Examples of the acceleration sensor include a longitudinal acceleration sensor that detects longitudinal acceleration of the vehicle, and a lateral acceleration sensor that detects lateral acceleration of the vehicle. The acceleration sensor transmits, for example, acceleration information of the vehicle to the ECU 10. The yaw rate sensor is a detector that detects a yaw rate (rotating angular velocity) around the vertical axis on the center of gravity of the vehicle. As the yaw rate sensor, for example, a gyro sensor can be used. The yaw rate sensor transmits the detected yaw rate information of the vehicle to the ECU 10.

The actuator 3 is a device used for controlling the vehicle. The actuator 3 includes at least a drive actuator, a brake actuator, and a steering actuator. The drive actuator controls the driving force of the vehicle by controlling the amount of air supplied to the engine (throttle opening) according to a control signal from the ECU 10. When the vehicle is a hybrid vehicle, the driving force is controlled by inputting the control signal from the ECU 10 to a motor serving as a power source in addition to controlling the amount of air supplied to the engine. When the vehicle is an electric vehicle, the driving force is controlled by inputting the control signal from the ECU 10 to the motor serving as the power source. The motor serving as the power source in these cases composes the actuator 3.

The brake actuator controls a braking force applied to the wheel of the vehicle by controlling a brake system according to a control signal from the ECU 10. As the brake system, for example, a hydraulic brake system can be used. The steering actuator controls, according to the control signal from the ECU 10, driving of an assist motor that controls a steering torque in an electric power steering system. As such, the steering actuator controls the steering torque of the vehicle.

Next, a functional configuration of the ECU 10 will be described. The ECU 10 includes a traffic signal recognition unit 11, a stop line position estimation unit 12, a stop line detection unit 13, and a vehicle control unit 14. The traffic signal recognition unit 11, the stop line position estimation unit 12, and the stop line detection unit 13 compose the stop line position estimation device 101. The stop line position estimation device 101 may be the ECU 10 itself. Some of the functions of the ECU 10 to be described below may be executed in a server communicable with the vehicle.

The traffic signal recognition unit 11 recognizes a traffic signal at an intersection ahead of the vehicle based on a detection result by the external sensor 1. A traffic signal to be recognized by the traffic signal recognition unit 11 includes a vehicle traffic signal which is opposite the vehicle and facing the front of the vehicle. The traffic signal ahead of the vehicle described in the present embodiment does not include a traffic signal of which rear side faces to the vehicle or a traffic signal facing the lateral direction with respect to the vehicle. However, the traffic signal recognition unit 11 may have a function of recognizing a traffic signal of which the rear side face to the vehicle and a traffic signal facing the lateral direction with respect to the vehicle. Further, the traffic signal recognition unit 11 does not have to recognize the intersection.

The traffic signal recognition unit 11 recognizes a traffic signal by pattern matching using a traffic signal image pattern stored in advance based on, for example, an image captured by the camera. The traffic signal recognition unit 11 may recognize the traffic signal using other image processing. Alternatively, the traffic signal recognition unit 11 may recognize the traffic signal based on information on the object detected by the radar sensor.

As the traffic signal recognition, the traffic signal recognition unit 11 recognizes a relative position of the traffic signal with respect to the vehicle. The traffic signal recognition unit 11 can recognize the relative position of the traffic signal with respect to the vehicle by a well-known method using image processing on an image captured by the camera. Alternatively, the traffic signal recognition unit 11 may recognize the relative position of the traffic signal with respect to the vehicle by combining the image processing on the image captured by the camera with the detection result by the radar sensor.

The traffic signal recognition unit 11 recognizes a pedestrian traffic signal in addition to the vehicle traffic signal. The vehicle traffic signal indicates that the vehicle is allowed to enter, or prohibited from entering, the intersection. The pedestrian traffic signal indicates that a pedestrian is allowed to cross, or prohibited from crossing, a crosswalk.

Further, the traffic signal recognition unit 11 may recognize a lighting state of the traffic signal using the image processing, when, for example, controlling the vehicle (including driving assistance) as the vehicle control system 100 based on the lighting state of the traffic signal. The traffic signal recognition unit 11 may determine whether the traffic signal corresponds to a lane on which the vehicle travels based on the direction of the traffic signal with respect to the vehicle and the yaw rate of the vehicle.

The traffic signal recognition unit 11 may estimate a position of a hidden traffic signal, which is in a hidden state after it has been recognized. The hidden state is a state in which a once-recognized traffic signal cannot be recognized due to a cutting-in of a preceding vehicle having a high vehicle height, a tree branch extending on a road, or the like. The hidden traffic signal is a traffic signal in the hidden state.

The traffic signal recognition unit 11 estimates the position of the hidden traffic signal based on the position of the hidden traffic signal when it has been recognized and a change in a position of the vehicle. The position of the hidden traffic signal when it has been recognized is a position (a relative position with respect to the vehicle) before the state of the recognized traffic signal becomes the hidden state. The change in the position of the vehicle can be calculated using so-called odometry based on a detection result by the internal sensor 2. For example, the traffic signal recognition unit 11 calculates the change in the position of the vehicle using the detection result by the vehicle speed sensor and the detection result by the yaw rate sensor. Alternatively, the traffic signal recognition unit 11 may calculate the change in the position of the vehicle using the vehicle speed information and a vehicle traveling path, not odometry. Then, the traffic signal recognition unit 11 estimates the position of the hidden traffic signal using the position of the hidden traffic signal when it has been recognized and the calculated change in the position of the vehicle. The method of estimating the position of the hidden traffic signal is not limited to the above.

When the traffic signal recognition unit 11 recognizes the traffic signal (the vehicle traffic signal) ahead of the vehicle, the stop line position estimation unit 12 estimates the stop line position based on a position of the traffic signal. In a case, such as when the traffic signal recognition unit 11 recognizes only one traffic signal, the stop line position estimation unit 12 basically estimates that the stop line position is a position from the traffic signal by a first distance toward the vehicle side.

The first distance is a preset distance and is not particularly limited. When the traffic signal recognition unit 11 recognizes only the traffic signal at the rear of the intersection, the first distance may be set as a distance long enough to avoid a wrong estimation that the stop line is within the intersection. The first distance may be 15 m or longer and less than 80 m. The first distance may be, for example, 30 m.

When the traffic signal recognition unit 11 recognizes a plurality of traffic signals, the stop line position estimation unit 12 determines whether it has recognized an immediate front traffic signal in the immediate front (that is, on the vehicle side) of the intersection and closest to the vehicle, and a rear traffic signal on a far side of the intersection based on a positional relationship between the plurality of traffic signals. The far side of the intersection is an opposite side of the intersection from the vehicle side. When recognizing the immediate front traffic signal and the rear traffic signal, the stop line position estimation unit 12 estimates that the stop line position is a position from the immediate front traffic signal by a second distance toward the vehicle side.

The second distance is a preset distance and shorter than the first distance. Since the stop line position estimation unit 12 can estimate the position of the stop line based on the immediate front traffic signal once it recognizes the immediate front traffic signal and the rear traffic signal, the second distance can be a short distance. The second distance may be 1 m or longer and less than 15 m. The second distance may be, for example, 10 m.

The immediate front traffic signal is a vehicle traffic signal in the immediate front of the intersection and closest to the vehicle. The rear traffic signal is a traffic signal at the rear of the intersection. The rear traffic signal may be a vehicle traffic signal or a pedestrian traffic signal to be described below.

Figure 2:
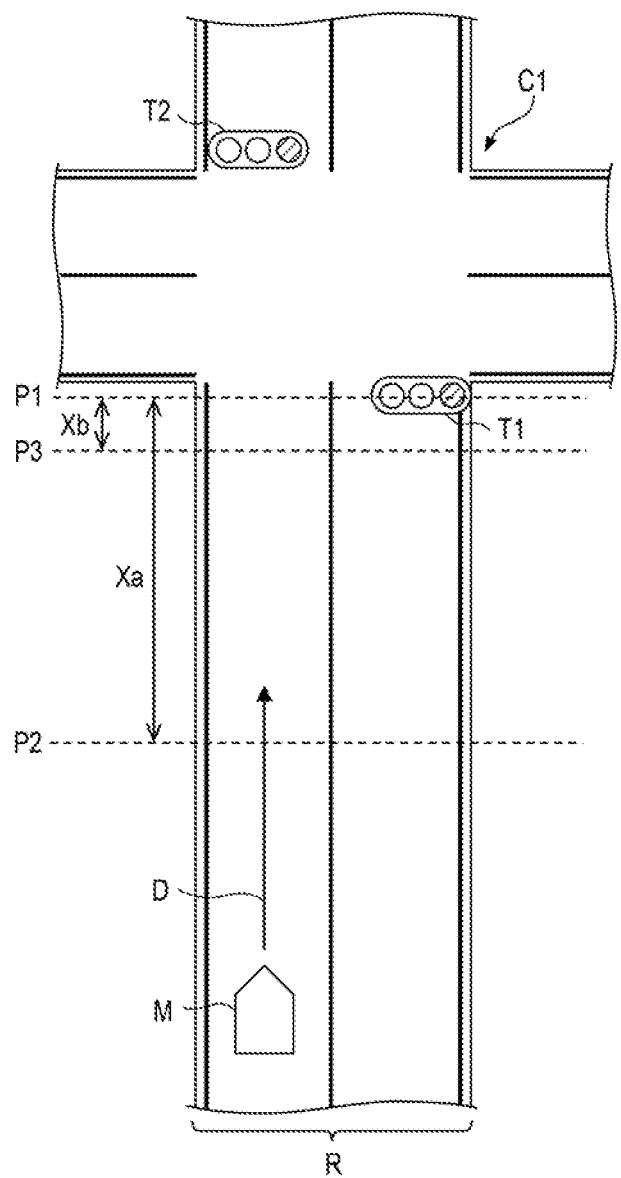
FIG. 2 is a top view of an intersection for describing one example of estimation of a position of a stop line.

Here, FIG. 2 is a top view of an intersection for describing one example of estimation of the stop line position. FIG. 2 illustrates a vehicle M, a proceeding direction D of the vehicle M, a traveling road R on which the vehicle M travels, an intersection C1 ahead of the vehicle M, a traffic signal T1 in the immediate front of the intersection C1, a traffic signal T2 at the rear of the intersection C1, and a position P1 of the traffic signal T1 in the proceeding direction D of the vehicle M.

In the example illustrated in FIG. 2, when the traffic signal recognition unit 11 recognizes only the traffic signal T1 in the immediate front of the intersection C1, the stop line position estimation unit 12 estimates that a stop line position is a position P2 from the traffic signal T1 by a first distance $X_a$ toward the vehicle side (the side of the vehicle M).

On the other hand, when the traffic signal recognition unit 11 recognizes two traffic signals T1, T2, the stop line position estimation unit 12 recognizes the immediate front traffic signal and the rear traffic signal, respectively, based on the positional relationship between the traffic signals T1, T2. Recognition of the immediate front traffic signal and the rear traffic signal will be described below. When recognizing the traffic signal T1 in the immediate front of the intersection C1 and closest to the vehicle M as the immediate front traffic signal, and the traffic signal T2 at the rear of the intersection C1 as the rear traffic signal, respectively, the stop line position estimation unit 12 estimates that a stop line position is a position P3 from the immediate front traffic signal T1 by a second distance $X_b$ toward the vehicle M side.

Next, recognition of the immediate front traffic signal and the rear traffic signal by the stop line position estimation unit 12 will be described. When the traffic signal recognition unit 11 recognizes the plurality of traffic signals, the stop line position estimation unit 12 recognizes the immediate front traffic signal and the rear traffic signal based on the positional relationship between the plurality of traffic signals.

When the traffic signal recognition unit 11 recognizes the plurality of traffic signals, the stop line position estimation unit 12 first assumes that the traffic signal (the vehicle traffic signal) closest to the vehicle M is the immediate front traffic signal. Then, the stop line position estimation unit 12 determines whether there is a traffic signal of which the distance from the immediate front traffic signal in the proceeding direction D of the vehicle M is less than a same intersection threshold. The stop line position estimation unit 12 does not recognize as the rear traffic signal, the traffic signal of which a distance from the immediate front traffic signal is equal to or greater than the same intersection threshold.

The same intersection threshold is a threshold of a preset value. The same intersection threshold is used to narrow down the recognized plurality of traffic signals to the traffic signals at the same intersection when, for example, intersections are consecutively positioned in the proceeding direction D of the vehicle M.

Figure 3:
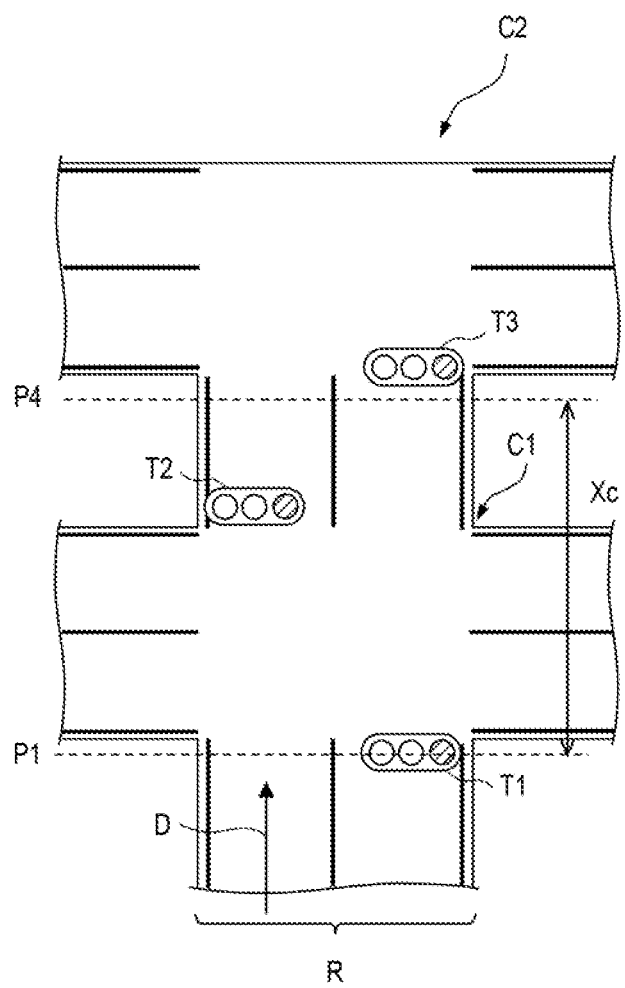
FIG. 3 is a top view for describing one example of consecutively positioned intersections.

FIG. 3 is a top view for describing one example of consecutively positioned intersections. From the view of the vehicle M, FIG. 3 illustrates an intersection C2 positioned immediately ahead of the intersection C1, the traffic signal T3 in the immediate front of the intersection C2, and a position P4 behind the immediate front traffic signal T1 by a same intersection threshold $X_c$. The traffic signal T3 is positioned at the rear of the position P4 and has a distance from the immediate front traffic signal T1 equal to or greater than the same intersection threshold $X_c$. The same components as those in FIG. 2 are denoted by the same reference signs, and description thereof will be omitted.

In the example illustrated in FIG. 3, the stop line position estimation unit 12 does not recognize as the rear traffic signal, the traffic signal T3 of which the distance from the immediate front traffic signal T1 is equal to or less than the same intersection threshold $X_c$. Thus, the stop line position estimation unit 12 excludes the traffic signal T3 from a candidate for the rear traffic signal. On the contrary, the stop line position estimation unit 12 recognizes, as a candidate for the rear traffic signal, the traffic signal T2 of which the distance from the immediate front traffic signal T1 is less than the same intersection threshold $X_c$. As such, the stop line position estimation unit 12 can restrict the traffic signal T3 at a second intersection C2 from the view of the vehicle M from being wrongly recognized as the rear traffic signal at a first intersection C1.

When there are traffic signals of which the distances from the immediate front traffic signal in the proceeding direction D of the vehicle M are less than the same intersection threshold $X_c$, the stop line position estimation unit 12 determines whether there is a traffic signal which is farthest from the vehicle M among the traffic signals of which the distances from the immediate front traffic signal are less than the same intersection threshold $X_c$, and has a distance from an intermediate position with the immediate front traffic signal equal to or greater than a proximity threshold. The stop line position estimation unit 12 does not recognize as the rear traffic signal, a traffic signal which is farthest from the vehicle M among the traffic signals of which the distances from the immediate front traffic signal are less than the same intersection threshold $X_c$ and has a distance from the intermediate position with the immediate front traffic signal less than the proximity threshold.

The proximity threshold is a threshold of a preset value. The proximity threshold is used to avoid a wrong recognition that any one of the plurality of traffic signals in the immediate front of the intersection is recognized as the rear traffic signal when, for example, the plurality of traffic signals are installed on respective lanes in the immediate front of the intersection on a road having a plurality of lanes.

Figure 4A:
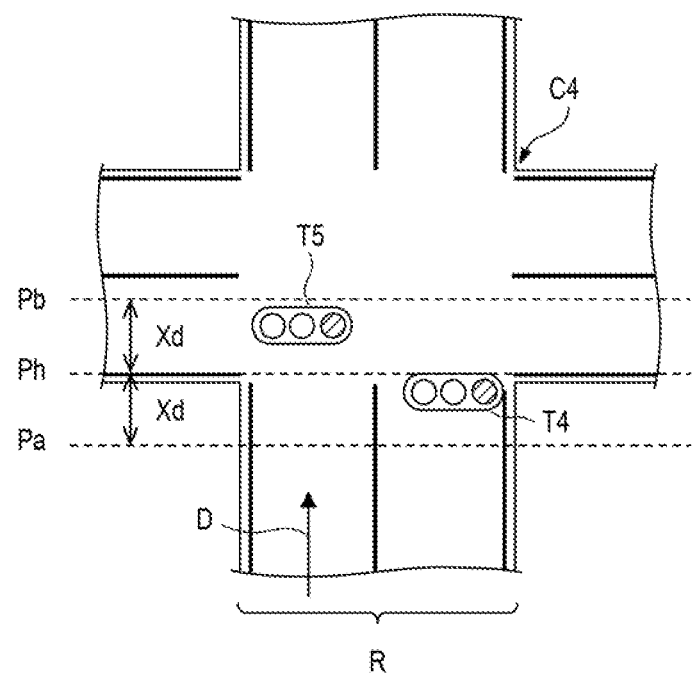
FIG. 4A is a top view of an intersection for describing one example of a case in which an installation position of a traffic signal is not specified.

FIG. 4A is a top view of an intersection for describing one example of a case in which an installation position of a traffic signal is not specified. FIG. 4A illustrates an intersection C4, a traffic signal T4 in the immediate front of the intersection C4, and a traffic signal T5. The traffic signals T4, T5 are installed on respective lanes in the immediate front of the intersection C4. In addition, FIG. 4A illustrates an intermediate position $P_h$ between the traffic signal T4 and the traffic signal T5 in the proceeding direction D of the vehicle M, a proximity threshold $X_d$, a position $P_a$ from the intermediate position $P_h$ by the proximity threshold $X_d$ toward the front of the intersection C4, and a position $P_b$ from the intermediate position $P_h$ by the proximity threshold $X_d$ toward the rear of the intersection C4. The traffic signal T5 is positioned between the position $P_a$ and the position $P_b$ in the proceeding direction D of the vehicle M.

In the example illustrated in FIG. 4A, the stop line position estimation unit 12 assumes that the traffic signal T4 closest to the vehicle M is the immediate front traffic signal. In addition, the stop line position estimation unit 12 recognizes the traffic signal T5 as a traffic signal which is farthest from the vehicle M and has a distance from the immediate front traffic signal T4 less than the same intersection threshold $X_c$.

In this example, the stop line position estimation unit 12 does not recognize as the rear traffic signal, the traffic signal T5 of which the distance from the intermediate position $P_h$ between the traffic signal T4 and the traffic signal T5 is less than the proximity threshold $X_d$. As such, the stop line position estimation unit 12 can restrict the traffic signal T4 and the traffic signal T5 that are installed on respective lanes in the immediate front of the intersection C4 from being wrongly recognized as a combination of the immediate front traffic signal and the rear traffic signal. Moreover, in this example, since the stop line position estimation unit 12 cannot recognize the rear traffic signal, the stop line position estimation unit 12 estimates that the stop line position is a position from the immediate front traffic signal T4 by the first distance toward the vehicle M side.

Figure 4B:
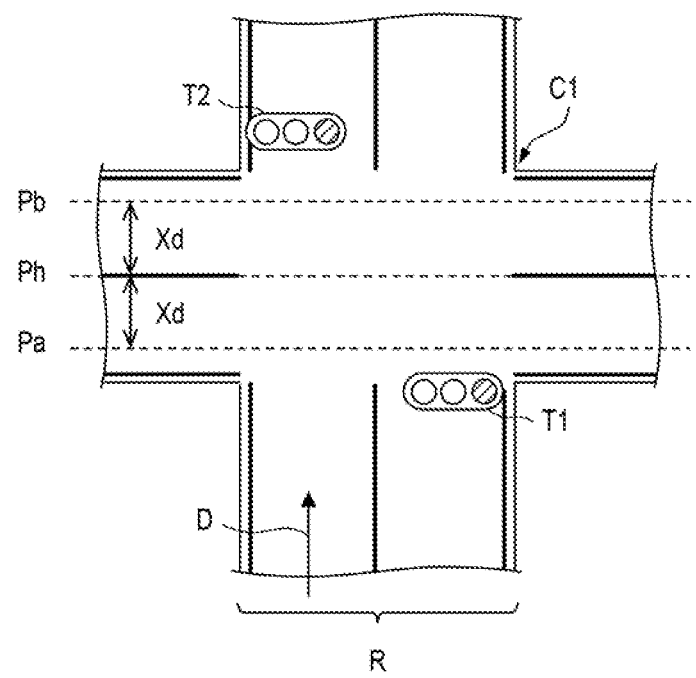
FIG. 4B is a top view of an intersection for describing one example of a case in which an installation position of a traffic signal is specified.

FIG. 4B is a top view of an intersection for describing one example of a case in which an installation position of a traffic signal is specified. FIG. 4B illustrates the intersection C1, the traffic signal T1, the traffic signal T2 as in FIG. 2. In addition, FIG. 4B illustrates an intermediate position $P_h$ between the traffic signal T1 and the traffic signal T2, a position $P_a$ from the intermediate position $P_h$ by the proximity threshold $X_d$ toward the front of the intersection C1, and a position $P_b$ from the intermediate position $P_h$ by the proximity threshold $X_d$ toward the rear of the intersection C1.

In the example illustrated in FIG. 4B, the stop line position estimation unit 12 recognizes the traffic signal T2 as the traffic signal which is farthest from the vehicle M and has a distance from the immediate front traffic signal T1 less than the same intersection threshold $X_c$. Further, the stop line position estimation unit 12 recognizes, as the rear traffic signal, the traffic signal T2 of which the distance from the intermediate position $P_h$ between the immediate front traffic signal T1 and the traffic signal T2 is equal to or greater than the proximity threshold $X_d$.

Next, another embodiment of recognition of the immediate front traffic signal and the rear traffic signal will be described. When at least one vehicle traffic signal and at least one pedestrian traffic signal are recognized as a plurality of signals at the intersection, the stop line position estimation unit 12 recognizes the vehicle traffic signal as the immediate front traffic signal, and the pedestrian traffic signal as the rear traffic signal, based on a positional relationship between the vehicle traffic signal and the pedestrian traffic signal.

When the vehicle traffic signals and the pedestrian traffic signals have been recognized, the stop line position estimation unit 12 determines whether the recognized vehicle traffic signals are positioned before the pedestrian traffic signal by a second proximity threshold $X_{d2}$ or more. The second proximity threshold $X_{d2}$ is a threshold of a preset value, and may be a value same as or different from the proximity threshold $X_d$. When the recognized vehicle traffic signals are positioned before the pedestrian traffic signal by a second proximity threshold $X_{d2}$ or more, the stop line position estimation unit 12 assumes that the vehicle traffic signal closest to the vehicle M among them is the immediate front traffic signal. Alternatively, the stop line position estimation unit 12 may assume that the vehicle traffic signal closest to the vehicle M is the immediate front traffic signal, regardless of whether the pedestrian traffic signal is recognized.

When assuming that the vehicle traffic signal is the immediate front traffic signal, the stop line position estimation unit 12 determines whether there is the pedestrian traffic signal of which the distance from the immediate front traffic signal in the proceeding direction D of the vehicle M is less than the same intersection threshold $X_c$. The stop line position estimation unit 12 does not recognize as the rear traffic signal, the pedestrian traffic signal of which the distance from the immediate front traffic signal is equal to or greater than the same intersection threshold $X_c$. As such, the stop line position estimation unit 12 can restrict the pedestrian traffic signal at another intersection from being wrongly recognized as the rear traffic signal. The value of the same intersection threshold $X_c$ when a target to be determined is the pedestrian traffic signal may differ from the value of the same intersection threshold $X_c$ when a target to be determined is the vehicle traffic signal.

When there are pedestrian traffic signals of which the distances from the immediate front traffic signal in the proceeding direction D of the vehicle are less than the same intersection threshold $X_c$, the stop line position estimation unit 12 determines whether there is a pedestrian traffic signal which is farthest from the vehicle M among the pedestrian traffic signals of which the distances from the immediate front traffic signal are less than the same intersection threshold $X_c$, and has a distance from the intermediate position with the immediate front traffic signal equal to or greater than the proximity threshold $X_d$. The stop line position estimation unit 12 does not recognize as the rear traffic signal, a pedestrian traffic signal which is farthest from the vehicle M and has a distance from the intermediate position with the immediate front traffic signal less than the proximity threshold $X_d$. As such, the stop line position estimation unit 12 can restrict the pedestrian traffic signal installed in the vicinity of the vehicle traffic signal at the rear of the intersection from being wrongly recognized as the rear traffic signal. The value of the proximity threshold $X_d$ when a target to be determined is the pedestrian traffic signal may differ from the value of the proximity threshold $X_d$ when a target to be determined is the vehicle traffic signal.

Figure 5:
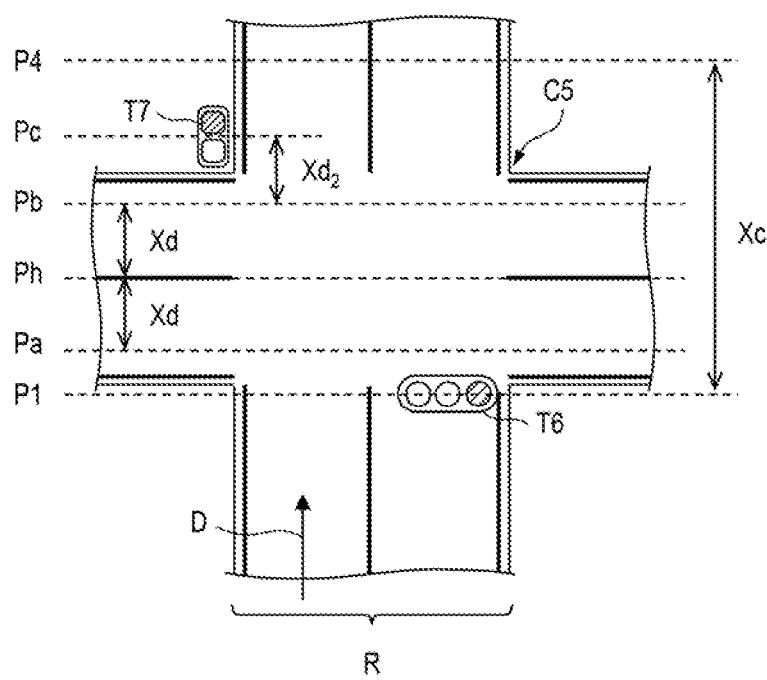
FIG. 5 is a top view of an intersection for describing one example of recognition of an immediate front traffic signal and a rear traffic signal using a pedestrian traffic signal.

FIG. 5 is a top view of an intersection for describing one example of recognition of the immediate front traffic signal and the rear traffic signal using the pedestrian traffic signal. FIG. 5 illustrates an intersection C5, a vehicle traffic signal T6 in the immediate front of the intersection C5, and a pedestrian traffic signal T7 at the intersection C5. Further, FIG. 5 illustrates a position $P_c$ of the pedestrian traffic signal T7, the position P4 from the vehicle traffic signal T6 by the same intersection threshold $X_c$ toward the rear of the intersection C5, an intermediate position $P_h$ between the vehicle traffic signal T6 and the pedestrian traffic signal T7, the position $P_a$ from the intermediate position $P_h$ by the proximity threshold $X_d$ toward the front of the intersection C5, and the position $P_b$ from the intermediate position $P_h$ by the proximity threshold $X_d$ toward the rear of the intersection C5. In addition, the position $P_b$ corresponds to a position from the position $P_c$ of the pedestrian traffic signal T7 by the second proximity threshold $X_{d2}$ toward the front of the intersection C5. However, the position $P_b$ from the intermediate position $P_h$ by the proximity threshold $X_d$ toward the rear of the intersection C5 does not have to be the same as a position from the position $P_c$ of the pedestrian traffic signal T7 by the second proximity threshold $X_{d2}$ toward the front of the intersection C5. The pedestrian traffic signal T7 is positioned in the front of the position P4 and at the rear of the position $P_b$. On the other hand, the vehicle traffic signal T6 is positioned before the pedestrian traffic signal T7 by a second proximity threshold $X_{d2}$ or more.

In the example of FIG. 5, the stop line position estimation unit 12 determines that the recognized vehicle traffic signal T6 is positioned before the pedestrian traffic signal T7 by a second proximity threshold $X_{d2}$ or more. The stop line position estimation unit 12 assumes that the vehicle traffic signal T6 positioned before the pedestrian traffic signal T7 by a second proximity threshold $X_{d2}$ or more and closest to the vehicle M is the immediate front traffic signal.

The stop line position estimation unit 12 determines that there are pedestrian traffic signals of which the distances from the immediate front traffic signal T6 in the proceeding direction D of the vehicle M are less than the same intersection threshold $X_c$. In addition, the stop line position estimation unit 12 determines that there is a pedestrian traffic signal T7 which is farthest from the vehicle M among the pedestrian traffic signals of which the distances from the immediate front traffic signal T6 are less than the same intersection threshold and has the distance from the intermediate position with the immediate front traffic signal equal to or greater than the proximity threshold $X_d$. Since the pedestrian traffic signal T7 is not excluded from targets to be recognized as the rear traffic signal, the stop line position estimation unit 12 determines that it has recognized the vehicle traffic signal T6 as the immediate front traffic signal, and the pedestrian traffic signal T7 as the rear traffic signal. As such, the stop line position estimation unit 12 may recognize the immediate front traffic signal and the rear traffic signals using the pedestrian traffic signals at the intersection.

In recognition of the immediate front traffic signal and the rear traffic signal as described above, the stop line position estimation unit 12 does not have to concurrently recognize the plurality of traffic signals ahead of the vehicle M. When the traffic signal recognition unit 11 estimates the position of the hidden traffic signal ahead of the vehicle M, the stop line position estimation unit 12 may recognize the immediate front traffic signal and the rear traffic signal using the plurality of traffic signals including the hidden traffic signal.

The stop line position estimation unit 12 may recognize the hidden traffic signal as the immediate front traffic signal or as the rear traffic signal. The hidden traffic signal does not have to be the vehicle traffic signal, and may be the pedestrian traffic signal. Moreover, both the immediate front traffic signal and the rear traffic signal may be the hidden traffic signals. When recognizing the hidden traffic signal as the immediate front traffic signal, the stop line position estimation unit 12 estimates the stop line position based on the position of the hidden traffic signal recognized as the immediate front traffic signal.

The stop line detection unit 13 detects the stop line ahead of the vehicle M based on the detection result by the external sensor 1 of the vehicle M. The stop line detection unit 13 detects the stop line on a road surface by pattern matching using an image pattern of the stop line based on, for example, an image captured by the camera. Alternatively, the stop line detection unit 13 may detect the stop line based on information on the object detected by the radar sensor. Alternatively, the stop line detection unit 13 may detect the stop line by a well-known method.

When the stop line position estimation unit 12 estimates the stop line position, the vehicle control unit 14 controls the vehicle M based on the estimated stop line position and the detection result by the external sensor 1 of the vehicle M. The vehicle control unit 14 controls the vehicle M based on a traveling state of the vehicle M, recognized from the detection result by the internal sensor 2. The vehicle control unit 14 controls the traveling of the vehicle M by transmitting a control signal to the actuator 3. The traveling of the vehicle M may be controlled by autonomous driving or driving assistance (for example, a driving assistance control of an operation of a brake pedal) of a driving operation of a driver.

For example, the vehicle control unit 14 decelerates the vehicle M so that the vehicle M can be smoothly stopped at the estimated stop line position when the traffic signal is changed to a passage prohibition state (for example, the red traffic light). The vehicle control unit 14 calculates a required deceleration using a distance to the estimated stop line position and speed of the vehicle M, and controls or assists deceleration by controlling an engine actuator and the brake actuator. For example, when the traffic signal is changed to the passage prohibition state (for example, the red light) while there is a preceding vehicle, the vehicle control unit 14 may decelerate the vehicle M so that the vehicle M can be smoothly stopped at a position behind the preceding vehicle which is stopped at the stop line position, assuming that the preceding vehicle is stopped at the stop line position.

Further, when the vehicle M approaches the intersection, since it is usually faster to recognize the traffic signal at the intersection than to detect the stop line in the immediate front of the intersection, the stop line position estimation unit 12 estimates the stop line position and then the stop line detection unit 13 detects the stop line. When the stop line detection unit 13 detects the stop line, the vehicle control unit 14 controls the vehicle M based on the detected stop line position instead of the estimated stop line position.

In addition, the vehicle control unit 14 does not have to control the traveling of the vehicle M. The vehicle control unit 14 may only provide the driver with information on the stop line position estimated by the stop line position estimation unit 12. The vehicle control unit 14 may provide various pieces of information to the driver by controlling a human machine interface (HMI) mounted on the vehicle M. For example, the vehicle control unit 14 may provide information to the driver by projecting the estimated stop line position on the front windshield of the vehicle M using a head-up display (HUD) that composes an HMI.

When it is estimated that the traffic signal is to be switched to the passage prohibition state and the vehicle M needs to be rapidly braked to be stopped at the estimated stop line position, the vehicle control unit 14 may alert the driver using a display, a sound, steering wheel vibrations, and the like. As such, even when the driver cannot visually recognize the stop line, it is possible to assist the driver to stop at an appropriate position according to a change in a lighting state of the traffic signal.

Processing of Vehicle Control System According to First Embodiment

Figure 6:
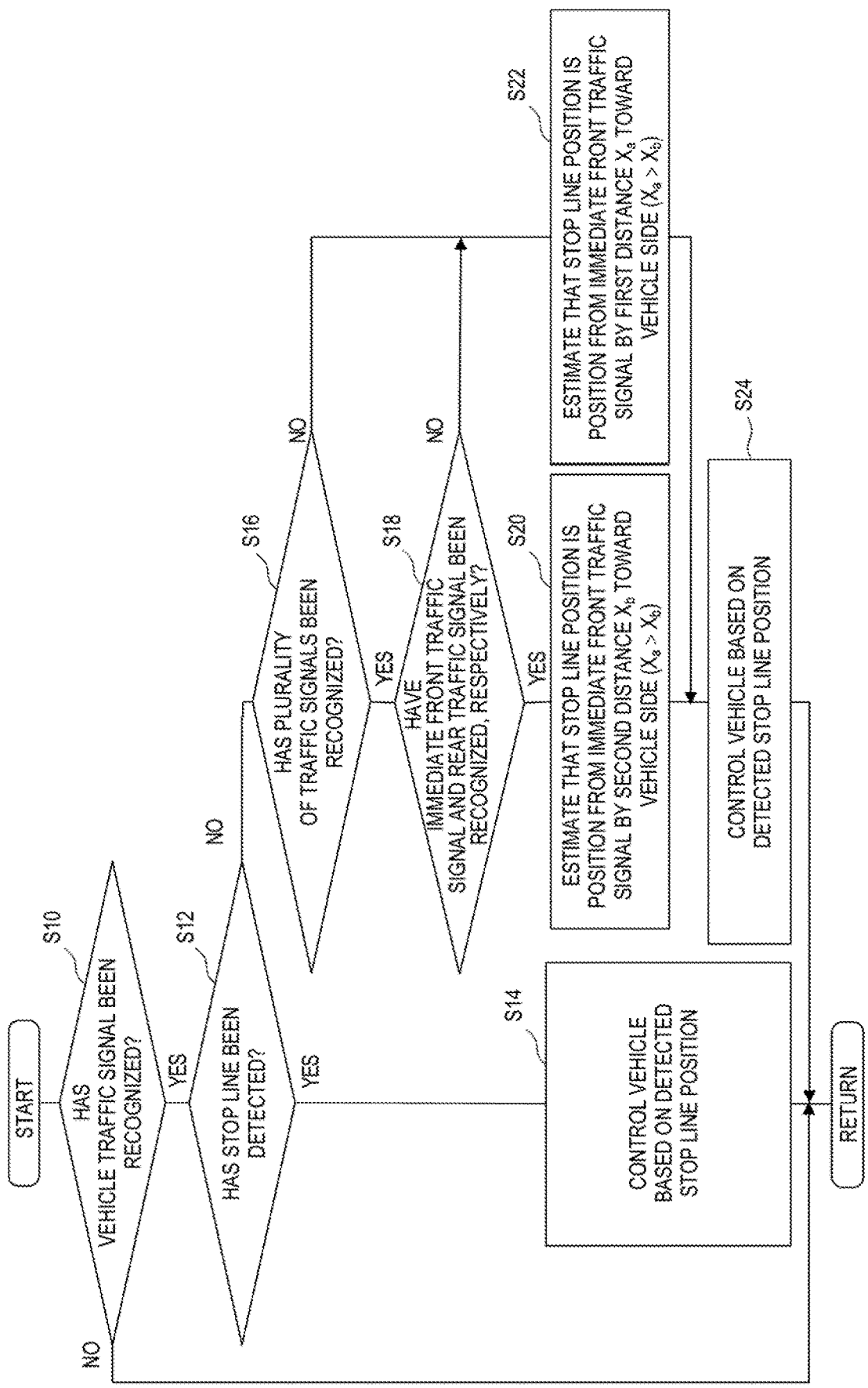
FIG. 6 is a flowchart illustrating one example of a process of estimation of the position of the stop line according to the first embodiment.

Hereinafter, processing of the vehicle control system 100 according to the first embodiment will be described with reference to the drawings. FIG. 6 is a flowchart illustrating one example of a process of estimation of the stop line position according to the first embodiment. The estimation process of the stop line position is executed, for example, when the vehicle M is traveling while driving assistance is permitted or when the vehicle M is autonomously driving.

As illustrated in FIG. 6, in S10, the ECU 10 of the vehicle control system 100 determines whether the traffic signal recognition unit 11 has recognized the vehicle traffic signal ahead of the vehicle M. The traffic signal recognition unit 11 recognizes the vehicle traffic signal by, for example, the pattern matching using the image pattern of the traffic signal stored in advance based on the image captured by the camera. When the ECU 10 determines that the traffic signal recognition unit 11 has recognized the vehicle traffic signal (Yes in S10), the ECU 10 proceeds to S12. When the ECU 10 determines that the traffic signal recognition unit 11 has not recognized the vehicle traffic signal, (No in S10), the ECU 10 ends the process.

In S12, the ECU 10 determines whether the stop line detection unit 13 has detected the stop line. The stop line detection unit 13 detects the stop line ahead of the vehicle M based on the detection result by the external sensor 1 of the vehicle M. When the stop line detection unit 13 has detected the stop line (Yes in S12), the ECU 10 proceeds to S14. When the stop line detection unit 13 has not detected the stop line (No in S12), the ECU 10 proceeds to S16.

In S14, the vehicle control unit 14 of the ECU 10 controls the vehicle M based on the stop line position detected by the stop line detection unit 13. Even when the stop line position has already been estimated by the stop line position estimation unit 12, the vehicle control unit 14 performs control of the vehicle M, such as deceleration assistance by prioritizing the stop line position detected by the stop line detection unit 13. Thereafter, the ECU 10 ends the process.

In S16, the ECU 10 determines whether the traffic signal recognition unit 11 has recognized a plurality of traffic signals ahead of the vehicle M. The plurality of traffic signals may include a hidden traffic signal, or all of them may be hidden traffic signals. When the ECU 10 determines that the traffic signal recognition unit 11 has recognized the plurality of traffic signals (Yes in S16), the ECU 10 proceeds to S18. When the ECU 10 determines that the traffic signal recognition unit 11 has not recognized the plurality of traffic signals (No in S16), the ECU 10 proceeds to S22.

In S18, the ECU 10 determines whether the stop line position estimation unit 12 has recognized the immediate front traffic signal and the rear traffic signal, respectively. A recognition process of the immediate front traffic signal and the rear traffic signal will be described below. When the ECU 10 determines that the stop line position estimation unit 12 has recognized the immediate front traffic signal and the rear traffic signal, respectively (Yes in S18), the ECU 10 proceeds to S20. When the ECU 10 determines that the stop line position estimation unit 12 has not recognized the immediate front traffic signal and the rear traffic signal, respectively (No in S18), the ECU 10 proceeds to S22.

In S20, the stop line position estimation unit 12 of the ECU 10 estimates that the stop line position is the position from the immediate front traffic signal by the second distance $X_b$ toward the vehicle side. The second distance $X_b$ is shorter than the first distance $X_a$. Thereafter, the ECU 10 proceeds to S24.

In S22, the stop line position estimation unit 12 of the ECU 10 estimates that the stop line position is the position from the immediate front traffic signal by the first distance $X_a$ toward the vehicle side. Thereafter, the ECU 10 proceeds to S24.

In S24, the vehicle control unit 14 of the ECU 10 controls the vehicle M based on the stop line position estimated by the stop line position estimation unit 12. The vehicle control unit 14 performs control of the vehicle M, such as the deceleration assistance based on the estimated stop line position. Thereafter, the ECU 10 ends the process.

Figure 7:
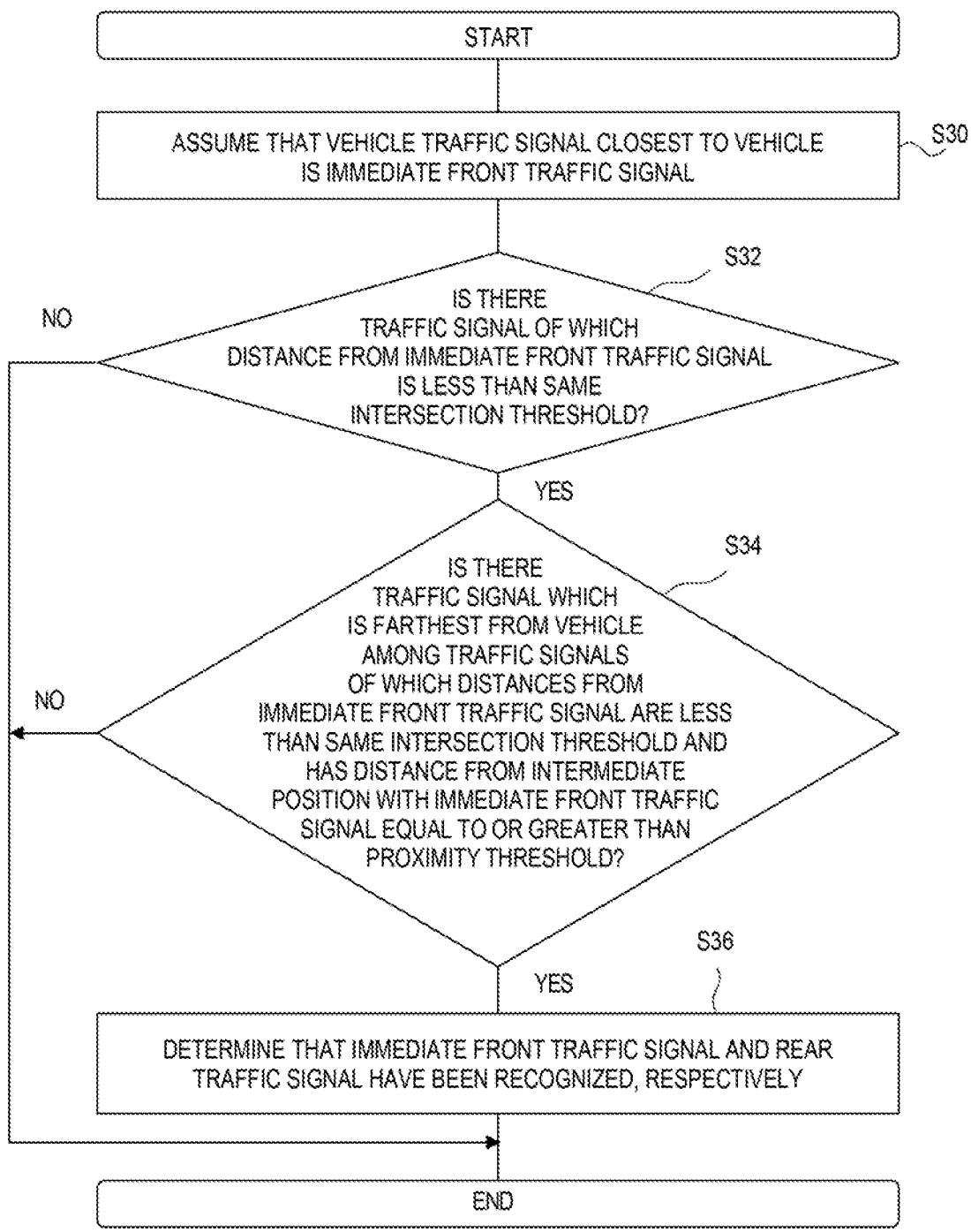
FIG. 7 is a flowchart illustrating one example of a process of recognition of the immediate front traffic signal and the rear traffic signal.

FIG. 7 is a flowchart illustrating one example of the recognition process of the immediate front traffic signal and the rear traffic signal. As illustrated in FIG. 7, in S30, the stop line position estimation unit 12 of the ECU 10 assumes that the vehicle traffic signal closest to the vehicle M is the immediate front traffic signal.

In S32, the stop line position estimation unit 12 of the ECU 10 determines whether there is the traffic signal of which the distance from the immediate front traffic signal in the proceeding direction D of the vehicle M is less than the same intersection threshold $X_c$. When the stop line position estimation unit 12 determines that there is the traffic signal of which the distance from the immediate front traffic signal is less than the same intersection threshold $X_c$ (Yes in S32), the ECU 10 proceeds to S34. When the stop line position estimation unit 12 determines that there is no traffic signal of which the distance from the immediate front traffic signal is less than the same intersection threshold $X_c$ (No in S32), the ECU 10 ends the process on the assumption that the immediate front traffic signal and the rear traffic signal are not recognized. Thereafter, the ECU 10 proceeds to S22 in FIG. 6. In other words, the stop line position estimation unit 12 does not recognize as the rear traffic signal, the traffic signal of which the distance from the immediate front traffic signal is equal to or greater than the same intersection threshold $X_c$.

In S34, the stop line position estimation unit 12 of the ECU 10 determines whether there is the traffic signal which is farthest from the vehicle M among the traffic signals of which the distances from the immediate front traffic signal are less than the same intersection threshold $X_c$ and has a distance from the intermediate position with the immediate front traffic signal equal to or greater than the proximity threshold $X_d$. When the stop line position estimation unit 12 determines that there is the traffic signal of which the distance from the intermediate position is equal to or greater than the proximity threshold $X_d$ (Yes in S34), the ECU 10 proceeds to S36. When the stop line position estimation unit 12 determines that there is no traffic signal of which the distance from the intermediate position is equal to or greater than the proximity threshold $X_d$ (No in S34), the ECU 10 ends the process on the assumption that the immediate front traffic signal and the rear traffic signal are not recognized. Thereafter, the ECU 10 proceeds to S22 in FIG. 6.

In other words, the stop line position estimation unit 12 does not recognize as the rear traffic signal, the traffic signal which is farthest from the vehicle M among the traffic signals of which the distances from the immediate front traffic signal are less than the same intersection threshold $X_c$ and has the distance from the intermediate position with the immediate front traffic signal less than the proximity threshold $X_d$.

In S36, the ECU 10 determines that the stop line position estimation unit 12 has recognized the immediate front traffic signal and the rear traffic signal, respectively. Thereafter, the ECU 10 proceeds to S20 in FIG. 6.

Figure 8A:
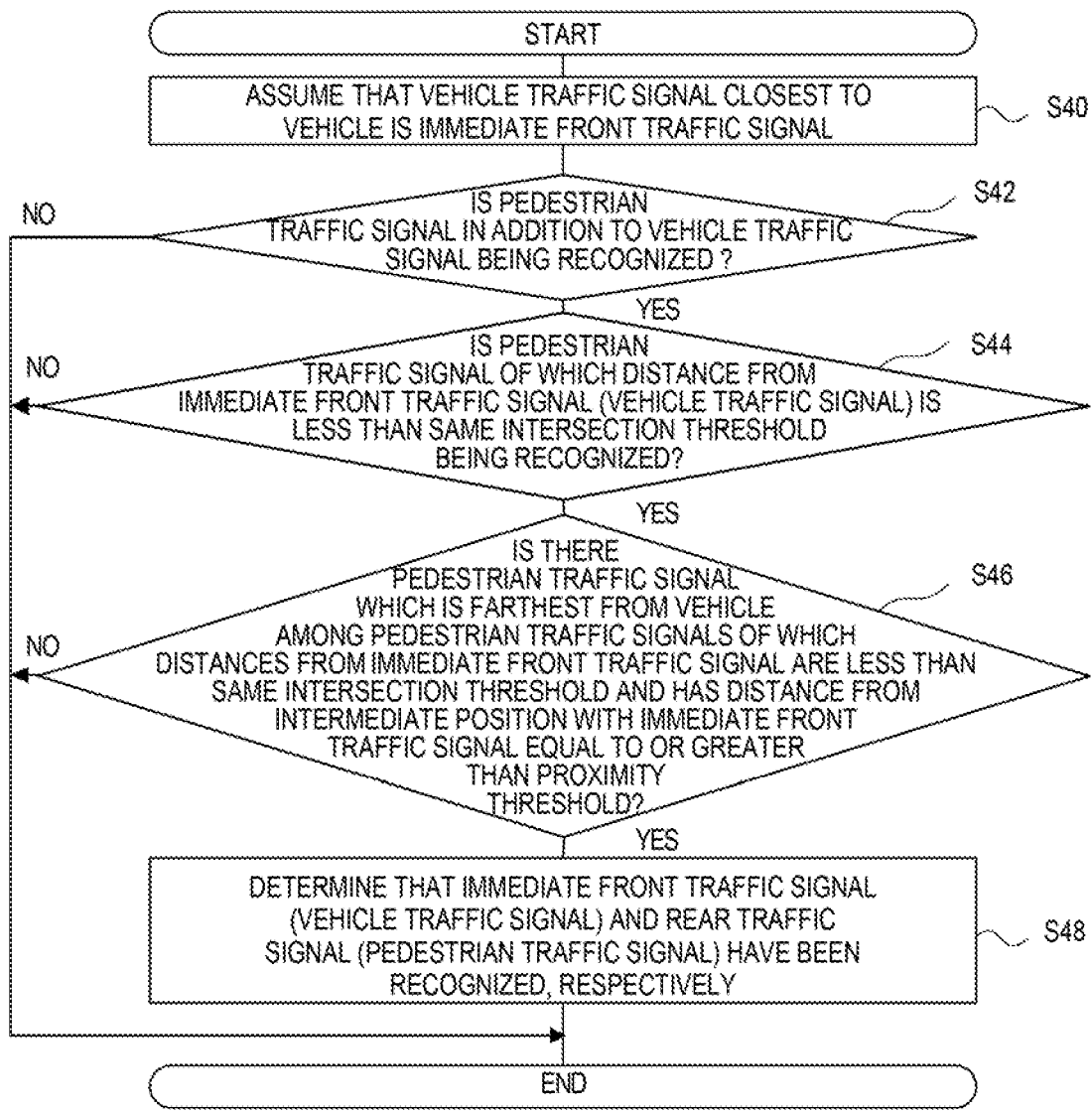
FIG. 8A is a flowchart illustrating one example of a process of recognition of the immediate front traffic signal and the rear traffic signal using the pedestrian traffic signal.

FIG. 8A is a flowchart illustrating one example of the recognition process of the immediate front traffic signal and the rear traffic signal using the pedestrian traffic signal. The processing of S40, S44, S46, and S48 in FIG. 8A corresponds to that of S30, S32, S34, and S36 in FIG. 7, respectively.

As illustrated in FIG. 8A, in S40, the stop line position estimation unit 12 of the ECU 10 assumes that the vehicle traffic signal closest to the vehicle M is the immediate front traffic signal. Here, the stop line position estimation unit 12 recognizes the vehicle traffic signal closest to the vehicle M as the immediate front traffic signal, regardless of whether the pedestrian traffic signal is recognized. Subsequently, in S42, the ECU 10 determines whether the stop line position estimation unit 12 is recognizing the pedestrian traffic signal in addition to the vehicle traffic signal, respectively. When the ECU 10 determines that the stop line position estimation unit 12 is recognizing the pedestrian traffic signal (Yes in S42), the ECU 10 proceeds to S44. When the ECU 10 determines that the stop line position estimation unit 12 is not recognizing the pedestrian traffic signal, (No in S42), the ECU 10 ends the process. Thereafter, when the stop line position estimation unit 12 does not recognize the immediate front traffic signal and the rear traffic signal, the ECU 10 proceeds to S22 in FIG. 6.

In S44, the stop line position estimation unit 12 of the ECU 10 determines whether there is the pedestrian traffic signal of which the distance from the immediate front traffic signal in the proceeding direction D of the vehicle M is less than the same intersection threshold $X_c$. When the stop line position estimation unit 12 determines that there is the pedestrian traffic signal of which the distance from the immediate front traffic signal is less than the same intersection threshold $X_c$ (Yes in S44), the ECU 10 proceeds to S46. When the stop line position estimation unit 12 determines that there is no pedestrian traffic signal of which the distance from the immediate front traffic signal is less than the same intersection threshold $X_c$ (No in S44), the ECU 10 ends the process on the assumption that the immediate front traffic signal and the rear traffic signal are not recognized. In other words, the stop line position estimation unit 12 does not recognize as the rear traffic signal, the pedestrian traffic signal of which the distance from the immediate front traffic signal is equal to or greater than the same intersection threshold $X_c$. Thereafter, when the immediate front traffic signal and the rear traffic signal are not recognized, the ECU 10 proceeds to S22 in FIG. 6.

In S46, the stop line position estimation unit 12 of the ECU 10 determines whether there is the pedestrian traffic signal which is farthest from the vehicle M among the pedestrian traffic signals of which the distances from the immediate front traffic signal are less than the same intersection threshold $X_c$ and has a distance from the intermediate position with the immediate front traffic signal equal to or greater than the proximity threshold $X_d$. When the stop line position estimation unit 12 determines that there is the pedestrian traffic signal of which the distance from the intermediate position is equal to or greater than the proximity threshold $X_d$ (Yes in S46), the ECU 10 proceeds to S48. When the stop line position estimation unit 12 determines that there is no pedestrian traffic signal of which the distance from the intermediate position is equal to or greater than the proximity threshold $X_d$ (No in S46), the ECU 10 ends the process. Thereafter, when the immediate front traffic signal and the rear traffic signal are not recognized, the ECU 10 proceeds to S22 in FIG. 6.

In other words, the stop line position estimation unit 12 does not recognize as the rear traffic signal, the pedestrian traffic signal which is farthest from the vehicle M among the pedestrian traffic signals of which the distances from the immediate front traffic signal are less than the same intersection threshold $X_c$ and has a distance from the intermediate position with the immediate front traffic signal less than the proximity threshold $X_d$.

In S48, the ECU 10 determines that the stop line position estimation unit 12 has recognized the vehicle traffic signal as the immediate front traffic signal and the pedestrian traffic signal as the rear traffic signal, respectively. Thereafter, the ECU 10 ends the process, and proceeds to S20 in FIG. 6.

Moreover, after S42, the ECU 10 may determine whether the stop line position estimation unit 12 has recognized the vehicle traffic signal which is positioned before the pedestrian traffic signal by a second proximity threshold $X_{d2}$ or more. When the ECU 10 determines that the stop line position estimation unit 12 has recognized the vehicle traffic signal which is positioned before the pedestrian traffic signal by the second proximity threshold $X_{d2}$ or more, the ECU 10 proceeds to S44. When the ECU 10 determines that the stop line position estimation unit 12 has not recognized the vehicle traffic signal which is positioned before the pedestrian traffic signal by the second proximity threshold $X_{d2}$ or more, the ECU 10 may end the process.

Figure 8B:
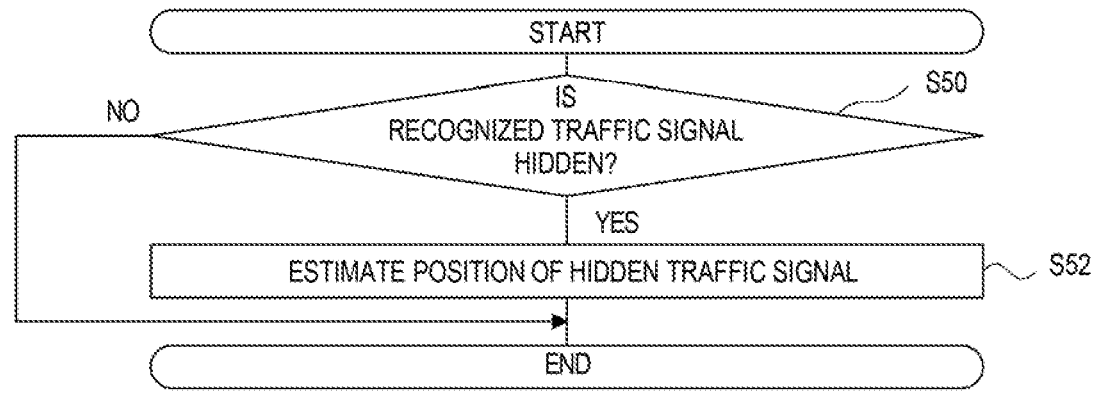
FIG. 8B is a flowchart illustrating one example of a process of estimation of a position of a hidden traffic signal.

FIG. 8B is a flowchart illustrating one example of a process of estimation of the position of the hidden traffic signal. The estimation process of the position of the hidden traffic signal is executed when the estimation process of the stop line position is executed.

As illustrated in FIG. 8B, in S50, the ECU 10 determines whether the traffic signal recognized by the traffic signal recognition unit 11 is hidden. When a once-recognized traffic signal is in the hidden state due to a cutting-in of a preceding vehicle having a high vehicle height, or the like, the ECU 10 determines that the recognized traffic signal is hidden. When determining that the traffic signal is hidden (Yes in S50), the ECU 10 proceeds to S52. When determining that the traffic signal is not hidden (No in S50), the ECU 10 ends the process.

In S52, the traffic signal recognition unit 11 of the ECU 10 estimates the position of the hidden traffic signal. The traffic signal recognition unit 11 estimates the position of the hidden traffic signal based on the position of the hidden traffic signal when it has been recognized and the change in the position of the vehicle M. When the vehicle M has passed the estimated position of the hidden traffic signal (when the hidden traffic signal is no longer the traffic signal ahead of the vehicle M), the traffic signal recognition unit 11 ends the estimation.

With the vehicle control system 100 (the stop line position estimation device 101) according to the first embodiment described above, when the plurality of traffic signals are recognized and it is determined that the immediate front traffic signal and the rear traffic signal have been recognized based on the positional relationship between the plurality of traffic signals, it is estimated that the stop line position at the intersection is a position from the immediate front traffic signal by the second distance $X_b$ (shorter than the first distance $X_a$) toward the vehicle side. Therefore, with the vehicle control system 100, it is possible to appropriately estimate the stop line position at the intersection as compared to when it is estimated that the stop line position is always a position from the traffic signal closest to the vehicle M by a certain distance toward the vehicle side while it is not clear whether the traffic signal is installed at the immediate front of the intersection or at the rear of the intersection.

Here, considering the case in which it is estimated that the stop line position is always a position from the traffic signal closest to the vehicle M by a certain distance toward the vehicle side, the traffic signal closest to the vehicle M may be the traffic signal installed at the rear of the intersection. Thus, in this case, it may be considered that the certain distance is set to be sufficiently long to avoid a wrong estimation that the stop line position is within the intersection. However, in this method, when the traffic signal closest to the vehicle M is the traffic signal installed in the immediate front of the intersection, it may be estimated that the stop line position is a position farther than necessary from the intersection, and thus vehicle control may be uncomfortable for occupants including the driver. On the contrary, in the vehicle control system 100, when the immediate front traffic signal and the rear traffic signal are recognized, it is possible to estimate that the stop line position is positioned from the immediate front traffic signal by a short distance (the second distance $X_b$) since the estimation is executed based on the traffic signal in the immediate front of the intersection. Therefore, in the vehicle control system 100, it is possible to perform control of the vehicle, such as deceleration and stop of the vehicle M, based on the appropriately estimated stop line position, such that a vehicle control which is less uncomfortable for the occupants including the driver is realized.

Further, with the vehicle control system 100, by executing determination using the same intersection threshold $X_c$, when a plurality of intersections is consecutively positioned in the proceeding direction D of the vehicle M, it is possible to restrict a traffic signal at a second intersection from the view of the vehicle M from being wrongly recognized as the rear traffic signal at a first intersection from the view of the vehicle M. In addition, with the vehicle control system 100, by executing determination using the proximity threshold $X_d$, when the traffic signals are installed on respective lanes at the immediate front of the intersection on a road having a plurality of lanes, it is possible to restrict the plurality of traffic signals at the immediate front of the intersection from being wrongly recognized as a combination of the immediate front traffic signal and the rear traffic signal.

With the vehicle control system 100, since the position of the hidden traffic signal that is in a hidden state after it has been recognized can be estimated, it is possible to recognize the immediate front traffic signal and the rear traffic signal based on the position of the hidden traffic signal even when only one traffic signal can be recognized.

With the vehicle control system 100, even if a plurality of vehicle traffic signals is not recognized, when at least one vehicle traffic signal and at least one pedestrian traffic signal are recognized, it is possible to recognize the immediate front traffic signal and the rear traffic signal based on the positional relationship between the vehicle traffic signal and the pedestrian traffic signal.

Second Embodiment

Figure 9:
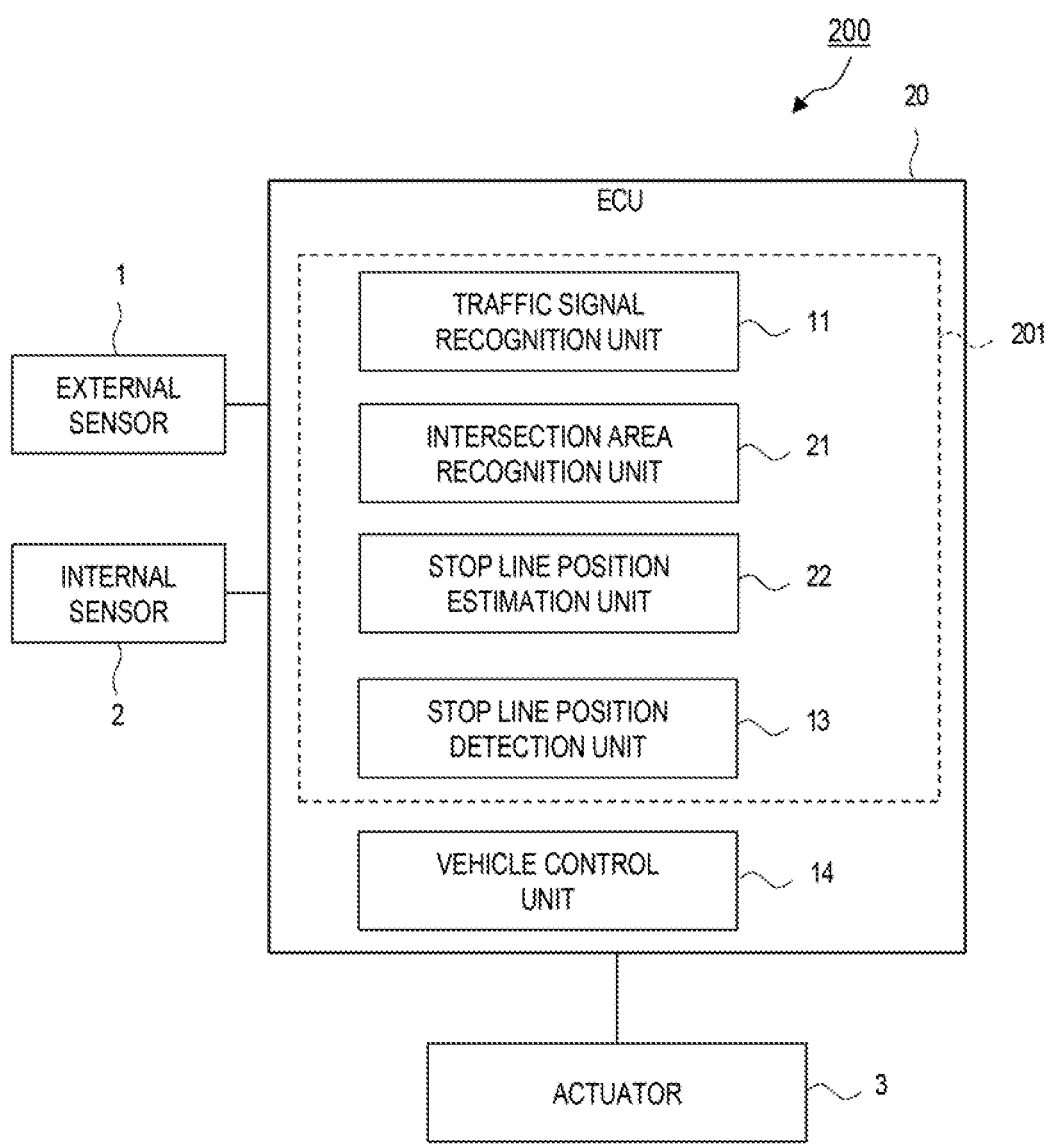
FIG. 9 is a block diagram illustrating one example of a vehicle control system according to a second embodiment.

Hereinafter, a vehicle control system according to a second embodiment will be described with reference to the drawings. FIG. 9 is a block diagram illustrating one example of the vehicle control system according to the second embodiment. A vehicle control system 200 illustrated in FIG. 9 includes a stop line position estimation device 201. The vehicle control system 200 (the stop line position estimation device 201) differs from that of the first embodiment in that the former recognizes the intersection area based on the detection result by the external sensor 1 of the vehicle M, and recognizes the immediate front traffic signal using the intersection area. The same components as those described in the first embodiment are denoted by the same reference, and description thereof will be omitted.

Configuration of Vehicle Control System According to Second Embodiment

As illustrated in FIG. 9, an ECU 20 of the vehicle control system 200 differs from that of the first embodiment in that the former includes an intersection area recognition unit 21 and that the stop line position estimation unit has a different function. In the second embodiment, the stop line position estimation device 201 includes the traffic signal recognition unit 11, the stop line detection unit 13, the intersection area recognition unit 21, and the stop line position estimation unit 22.

The intersection area recognition unit 21 recognizes the intersection area where a lane line of a road on which the vehicle M travels is cut off in a proceeding direction D of the vehicle M based on the detection result by the external sensor 1 of the vehicle M. The intersection area is an area that can be assumed to be an intersection based on the fact that the lane line is cut off.

The intersection area recognition unit 21 recognizes an end portion where the lane line is cut off based on, for example, an image captured by the camera or information (white line information) on the object detected by the radar sensor. When the length of the end portion of the lane line is equal to or greater than an intersection determination threshold, the intersection area recognition unit 21 recognizes the area ahead of the end portion of the lane line as the intersection area. The intersection determination threshold is a threshold of a preset value. When the intersection area recognition unit 21 recognizes not only the end portion (the end point) of the lane line in the immediate front of the intersection but also the end portion (the start point) of the lane line at the rear of the intersection, and the intersection area recognition unit 21 may recognize the intersection area on condition that a distance from the end point to the start point of the lane line is equal to or greater than the intersection determination threshold.

Moreover, the intersection area recognition unit 21 may recognize the intersection area by detecting a road that intersects the road on which the vehicle M travels. The intersection area recognition unit 21 may recognize the end portion of the lane line of the road that intersects the road on which the vehicle M travels, and use it for recognition of the intersection area.

Figure 10:
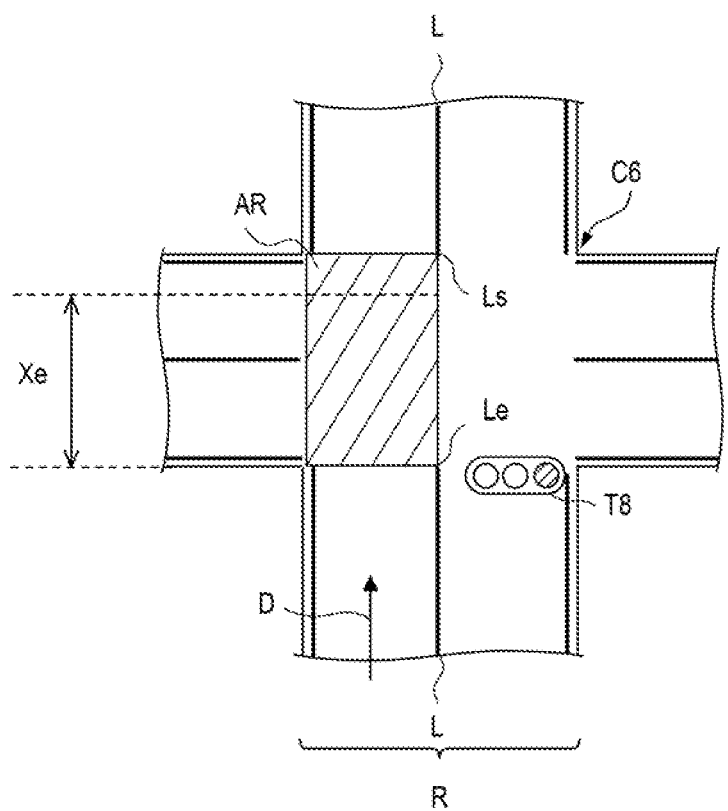
FIG. 10 is a top view of an intersection for describing one example of recognition of the immediate front traffic signal using an area of an intersection.

FIG. 10 is a top view of an intersection for describing one example of recognition of the immediate front traffic signal using the intersection area. FIG. 10 illustrates an intersection C6, a lane line L of the road R on which the vehicle M travels, an end point $L_e$ of the lane line L, a start point $L_s$ of the lane line L, an intersection determination threshold $X_e$, an intersection area AR, and a traffic signal T8 in the immediate front of the intersection C6. Here, it is assumed that the stop line is rubbed and cannot be detected.

In the example of FIG. 10, the intersection area recognition unit 21 recognizes the intersection area AR based on the fact that the lane line L is cut off in the proceeding direction D of the vehicle M and a distance from the end point $L_e$ to the start point $L_s$ is equal to or greater than the intersection determination threshold $X_e$. Moreover, when there is a plurality of lane lines, the intersection area recognition unit 21 does not have to recognize, as the intersection area, an area where even one lane line extends. On the contrary, the intersection area recognition unit 21 may recognize, as the intersection area AR, an area where all lane lines are cut off.

When the vehicle traffic signal recognition unit 11 recognizes the vehicle traffic signal ahead of the vehicle M, the stop line position estimation unit 22 estimates the stop line position based on the position of the vehicle traffic signal. The stop line position estimation unit 22 basically estimates that the stop line position is a position from the vehicle traffic signal by the first distance $X_a$ toward the vehicle side in a case such as when the traffic signal recognition unit 11 recognizes only one vehicle traffic signal.

When the traffic signal recognition unit 11 recognizes the vehicle traffic signal and the intersection area recognition unit 21 recognizes the intersection area, the stop line position estimation unit 22 determines whether there is the vehicle traffic signal on the vehicle side of the intersection area. When determining that there is the vehicle traffic signal on the vehicle side of the intersection area, the stop line position estimation unit 22 estimates that the stop line position is a position from the vehicle traffic signal closest to the vehicle M by the third distance toward the vehicle side.

The third distance is a preset distance and shorter than the first distance. Since the stop line position estimation unit 22 executes estimation based on the immediate front traffic signal instead of the rear traffic signal, it is possible to avoid a wrong estimation that the stop line position is within the intersection even when the third distance is short. The third distance may be 1 m or longer and less than 15 m. The third distance may be, for example, 10 m. The third distance may be different from or the same as the second distance $X_b$ in the first embodiment.

Process of Estimation of Stop Line Position According to Second Embodiment

Figure 11:
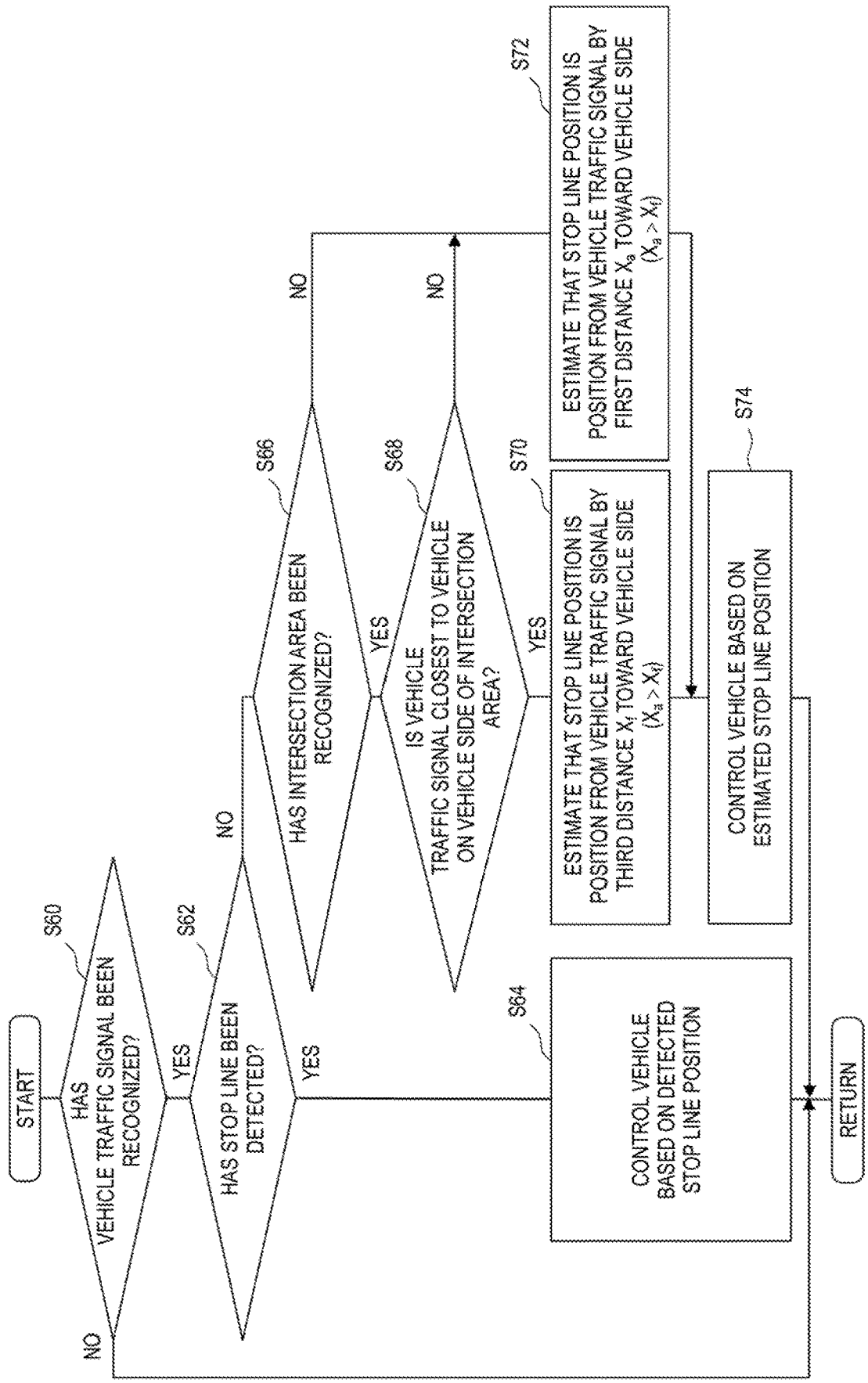
FIG. 11 is a flowchart illustrating one example of a process of estimation of the position of the stop line according to the second embodiment.

FIG. 11 is a flowchart illustrating one example of a process of estimation of the stop line position according to the second embodiment. Since S60, S62, and S64 in FIG. 11 are the same processes as those of S10, S12, and S14 in FIG. 6, respectively, the description thereof is omitted. Hereinafter, description will be made from S66.

As illustrated in FIG. 11, in S66, the ECU 20 of the vehicle control system 200 determines whether the traffic intersection area recognition unit 21 has recognized the intersection area. The intersection area recognition unit 21 recognizes the intersection area where a lane line of the road on which the vehicle M travels is cut off in the proceeding direction D of the vehicle M based on the detection result by the external sensor 1 of the vehicle M. When the ECU 20 determines that the intersection area recognition unit 21 has recognized the intersection area (Yes in S66), the ECU 20 proceeds to S68. When the ECU 20 determines that the intersection area recognition unit 21 has not recognized the intersection area (No in S66), the ECU 20 proceeds to S72.

In S68, the stop line position estimation unit 22 of the ECU 20 determines whether there is the vehicle traffic signal on the vehicle side of the intersection area. When the stop line position estimation unit 22 determines that there is the vehicle traffic signal on the vehicle side of the intersection area (Yes in S68), the ECU 20 proceeds to S70. When the stop line position estimation unit 22 determines that there is no vehicle traffic signal on the vehicle side of the intersection area (No in S68), the ECU 20 proceeds to S72.

In S70, the stop line position estimation unit 22 of the ECU 20 predicts that the stop line position is a position from the immediate front traffic signal by a third distance $X_f$ toward the vehicle side. The third distance $X_f$ is shorter than the first distance $X_a$. Thereafter, the ECU 20 proceeds to S74.

In S72, the stop line position estimation unit 22 of the ECU 20 estimates that the stop line position is a position from the immediate front traffic signal by the first distance $X_a$ toward the vehicle side. Thereafter, the ECU 20 proceeds to S74.

In S74, the vehicle control unit 14 of the ECU 20 controls the vehicle M based on the stop line position estimated by the stop line position estimation unit 22. The vehicle control unit 14 performs control of the vehicle M, such as the deceleration assistance, based on the estimated stop line position. Thereafter, the ECU 20 ends the process.

With the vehicle control system 200 (the stop line position estimation device 201) according to the second embodiment as described above, when the vehicle traffic signal and the intersection area are recognized, and the vehicle traffic signal closest to the vehicle M is positioned on the vehicle side of the intersection area, the vehicle control system 200 estimates that the stop line position is a position from the vehicle traffic signal closest to the vehicle M by the third distance $X_f$ (shorter than the first distance $X_a$) toward the vehicle side. Therefore, with the vehicle control system 200, it is possible to appropriately estimate the stop line position at the intersection as compared to when it is estimated that the stop line position is always the position from the traffic signal closest to the vehicle M by a certain distance toward the vehicle side while it is not clear whether the traffic signal is installed at the immediate front of the intersection or at the rear of the intersection. As a result, similar to the first embodiment, in the vehicle control system 200, it is possible to perform control of the vehicle, such as deceleration and stop of the vehicle M, based on the appropriately estimated stop line position, such that the vehicle control which is less uncomfortable for the occupants including the driver is realized.

The embodiments of the present disclosure have been described as the above, but the present disclosure is not limited thereto. The present disclosure may be implemented in variously modified and improved aspects based on the knowledge of those skilled in the art, including the above-described embodiment.

For example, the first embodiment and the second embodiment may be combined. The function of the vehicle control system 200 according to the second embodiment may be implemented in the vehicle control system 100 according to the first embodiment.

The stop line position estimation devices 101, 201 do not have to compose a part of the vehicle control system. The stop line position estimation devices 101, 201 may be composed as a single unit. The stop line position estimation devices 101, 201 do not have to be mounted on the vehicle M, and may be mounted on a server that can communicate with the vehicle M.

The vehicle control system 100 (the stop line position estimation device 101) may include an intersection recognition unit that recognizes the intersection ahead of the vehicle M based on map information and the position of the vehicle M on the map. The position of the vehicle on the map can be recognized using the global positioning system (GPS), the global navigation satellite system (GNSS), the simultaneous localization and mapping (SLAM), and the like. In addition to the method according to the above embodiments, the vehicle control system 100 may use the recognition result by the intersection recognition unit for recognition of the immediate front traffic signal.

The vehicle control systems 100, 200 (the stop line position estimation devices 101, 201) do not have to include the stop line detection unit 13. The vehicle control systems 100, 200 may only estimate a traffic signal.

The stop line position estimation unit 12 does not have to execute the processing (for example, S34 in FIG. 7) using the proximity threshold $X_d$. Alternatively, the stop line position estimation unit 12 may be configured not to recognize, as the rear traffic signal, the traffic signal of which the distance from the immediate front traffic signal in the proceeding direction D of the vehicle M is less than a set threshold, based on the immediate front traffic signal instead of the intermediate position. The set threshold is a threshold of a preset value. In addition, the stop line position estimation unit 12 does not have to execute the processing (for example, S32 in FIG. 7) using the same intersection threshold $X_c$. The stop line position estimation unit 12 may be configured to execute the processing using the same intersection threshold $X_c$ for the vehicle traffic signal, and not to execute the processing using the same intersection threshold $X_c$ for the pedestrian traffic signal. The same applies to the processing using the proximity threshold $X_d$.

The stop line position estimation unit 12 does not have to execute the estimation process of the position of the hidden traffic signal. The stop line position estimation unit 12 may be configured to proceed to S18 only when the plurality of traffic signals can be concurrently recognized in S16 in FIG. 6. The stop line position estimation unit 12 may be configured to proceed to S44 only when the vehicle traffic light and the pedestrian traffic light are concurrently recognized in S42 in FIG. 8A.

The traffic signal recognition unit 11 does not have to recognize the pedestrian traffic signal. The traffic signal recognition unit 11 may be configured to recognize only the vehicle traffic signal. Further, the stop line position estimation unit 12 does not have to execute the recognition process of the immediate front traffic signal and the rear traffic signal using the pedestrian traffic signal. The stop line position estimation unit 12 may be configured to use only the vehicle traffic signal.

What is claimed is:

1. A stop line position estimation device comprising:
   a traffic signal recognition unit configured to recognize a traffic signal at an intersection ahead of a vehicle based on a detection result by an external sensor of the vehicle; and
   a stop line position estimation unit configured to
      estimate that a position of a stop line is a position from the traffic signal by a first distance toward a vehicle side, and
      estimate, when the traffic signal recognition unit recognizes a plurality of traffic signals and the stop line position estimation unit recognizes an immediate front traffic signal and a rear traffic signal in a same intersection based on a positional relationship between the plurality of traffic signals, that the position of the stop line is a position from the immediate front traffic signal by a second distance toward the vehicle side, the second distance being shorter than the first distance, the immediate front traffic signal being a traffic signal on the vehicle side of the intersection and closest to the vehicle, and the rear traffic signal being a traffic signal on a far side of the intersection.

2. The stop line position estimation device according to claim 1, wherein the stop line position estimation unit is configured not to recognize, when the plurality of traffic signals is recognized, as the rear traffic signal, the traffic signal of which a distance from the immediate front traffic signal in a proceeding direction of the vehicle is equal to or greater than a same intersection threshold.

3. The stop line position estimation device according to claim 2, wherein:
the stop line position estimation unit is configured not to recognize a first traffic signal of which a distance from an intermediate position is less than a proximity threshold as the rear traffic signal when there are traffic signals of which the distances from the immediate front traffic signal in the proceeding direction of the vehicle are less than the same intersection threshold, the intermediate position being intermediate between the immediate front traffic signal and a traffic signal farthest from the vehicle among the traffic signals of which the distances from the immediate front traffic signal are less than the same intersection threshold.

4. The stop line position estimation device according to claim 1, wherein:
the traffic signal recognition unit is configured to estimate a position of a hidden traffic signal based on a position of the hidden traffic signal when having been recognized and change in a position of the vehicle, the hidden traffic signal being in a hidden state after having been recognized; and
the stop line position estimation unit is configured to estimate, when the traffic signal recognition unit recognizes the plurality of traffic signals including the hidden traffic signal ahead of the vehicle and the stop line position estimation unit recognizes the immediate front traffic signal and the rear traffic signal, that the position of the stop line is a position from the immediate front traffic signal by the second distance toward the vehicle side.

5. The stop line position estimation device according to claim 1, wherein:
the traffic signal recognition unit is configured to recognize a vehicle traffic signal and a pedestrian traffic signal; and
the stop line position estimation unit is configured to estimate, when the traffic signal recognition unit recognizes at least one vehicle traffic signal and at least one pedestrian traffic signal as the plurality of traffic signals and the stop line position estimation unit recognizes the vehicle traffic signal as the immediate front traffic signal and the pedestrian traffic signal as the rear traffic signal, based on the positional relationship between the vehicle traffic signal and the pedestrian traffic signal, that the position of the stop line is the position from the immediate front traffic signal by the second distance toward the vehicle side.

6. A stop line position estimation device comprising:
a traffic signal recognition unit configured to recognize a vehicle traffic signal at an intersection ahead of a vehicle based on a detection result by an external sensor of the vehicle;
an intersection area recognition unit configured to recognize, based on the detection result by the external sensor, an intersection area where a lane line of a road on which the vehicle travels is cut off in a proceeding direction of the vehicle; and
a stop line position estimation unit configured to
estimate that a position of a stop line is a position from the vehicle traffic signal by a first distance toward a vehicle side, and
estimate, when the traffic signal recognition unit recognizes a plurality of vehicle traffic signals in a same intersection, the intersection area recognition unit recognizes the intersection area, and one vehicle traffic signal among the plurality of vehicle traffic signals is present on the vehicle side of the intersection area, that the position of the stop line is a position from the vehicle traffic signal closest to the vehicle by a third distance toward the vehicle side, the third distance being shorter than the first distance.

7. A vehicle control system comprising:
a traffic signal recognition unit configured to recognize a traffic signal at an intersection ahead of a vehicle based on a detection result by an external sensor of the vehicle;
a stop line position estimation unit configured to
estimate that a position of a stop line is a position from the traffic signal by a first distance toward a vehicle side and
estimate, when the traffic signal recognition unit recognizes a plurality of traffic signals and the stop line position estimation unit recognizes an immediate front traffic signal and a rear traffic signal in a same intersection based on a positional relationship between the plurality of traffic signals, that the position of the stop line is a position from the immediate front traffic signal by a second distance toward the vehicle side, the second distance being shorter than the first distance the immediate front traffic signal being a traffic signal on the vehicle side of the intersection and closest to the vehicle, and the rear traffic signal is a traffic signal on a far side of the intersection; and
a vehicle control unit configured to control the vehicle based on the position of the stop line estimated by the stop line position estimation unit and the detection result by the external sensor.

* * * * *